United States Patent
Gilliam et al.

(10) Patent No.: US 10,236,526 B2
(45) Date of Patent: Mar. 19, 2019

(54) ON-LINE MONITORING OF PROCESS/SYSTEM

(71) Applicant: Calera Corporation, Moss Landing, CA (US)

(72) Inventors: Ryan J. Gilliam, San Jose, CA (US); Thomas A. Albrecht, Sunnyvale, CA (US); Hong Zhao, Marina, CA (US); Diego Martinez, Monterey, CA (US); Rebecca L. King, Capitola, CA (US)

(73) Assignee: Calera Corporation, Moss Landing, CA (US)

( * ) Notice: Subject to any disclaimer, the term of this patent is extended or adjusted under 35 U.S.C. 154(b) by 93 days.

(21) Appl. No.: 15/441,704

(22) Filed: Feb. 24, 2017

(65) Prior Publication Data

US 2017/0250428 A1    Aug. 31, 2017

Related U.S. Application Data

(60) Provisional application No. 62/299,703, filed on Feb. 25, 2016.

(51) Int. Cl.
    *H01M 8/04992*    (2016.01)
    *H01M 8/04313*    (2016.01)
    *H01M 8/04791*    (2016.01)

(52) U.S. Cl.
    CPC ... *H01M 8/04992* (2013.01); *H01M 8/04313* (2013.01); *H01M 8/04798* (2013.01)

(58) Field of Classification Search
    CPC ......... H01M 8/04313; H01M 8/04798; H01M 8/04992
    See application file for complete search history.

(56) References Cited

U.S. PATENT DOCUMENTS

| | | | |
|---|---|---|---|
| 4,108,752 | A | 8/1978 | Pohto et al. |
| 4,111,779 | A | 9/1978 | Seko et al. |
| 4,643,818 | A | 2/1987 | Seko et al. |
| 5,349,254 | A | 9/1994 | Sakarya |
| 5,833,830 | A | 11/1998 | Gonzalez et al. |
| 6,540,902 | B1 | 4/2003 | Redey, I et al. |
| 6,591,199 | B2 | 7/2003 | Tremblay et al. |
| 7,616,006 | B2 | 11/2009 | Tremblay et al. |
| 7,735,274 | B2 | 6/2010 | Constantz et al. |
| 7,744,761 | B2 | 6/2010 | Constantz et al. |

(Continued)

FOREIGN PATENT DOCUMENTS

| | | |
|---|---|---|
| EP | 2253600 A1 | 11/2010 |
| WO | WO-2008018928 A2 | 2/2008 |

(Continued)

OTHER PUBLICATIONS

Andersson, et al. High power diode laser cladding. Fabricating and Metalworking. Mar. 2014; 24-26.

(Continued)

*Primary Examiner* — Shogo Sasaki
(74) *Attorney, Agent, or Firm* — Calera Corporation; Vandana Bansal

(57) ABSTRACT

Disclosed herein are methods and systems that relate to an on-line monitoring of a process/system by controlling rate of oxidation of metal ions at an anode in an anode electrolyte of an electrochemical process and controlling rate of reduction of the metal ions in a catalysis process to achieve steady state.

3 Claims, 4 Drawing Sheets

(56) References Cited

U.S. PATENT DOCUMENTS

| | | |
|---|---|---|
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,797,137 B2 | 9/2010 | Veillette et al. |
| 7,815,880 B2 | 10/2010 | Constantz et al. |
| 7,818,276 B2 | 10/2010 | Veillette et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,114,265 B2 | 2/2012 | Berriah et al. |
| 8,137,455 B1 | 3/2012 | Constantz et al. |
| 8,152,987 B2 | 4/2012 | Tremblay et al. |
| 9,187,834 B2 | 11/2015 | Albrecht et al. |
| 9,187,835 B2 | 11/2015 | Albrecht et al. |
| 9,200,375 B2 | 12/2015 | Gilliam et al. |
| 9,957,621 B2 | 5/2018 | Albrecht et al. |
| 9,957,623 B2 | 5/2018 | Gilliam et al. |
| 2002/0155341 A1 | 10/2002 | Finkelshtain et al. |
| 2006/0016696 A1 | 1/2006 | Stevens et al. |
| 2006/0289312 A1 | 12/2006 | Tremblay et al. |
| 2008/0149494 A1 | 6/2008 | Tsuchiya et al. |
| 2008/0248350 A1* | 10/2008 | Little .................. C25B 1/04 429/443 |
| 2009/0001020 A1 | 1/2009 | Constantz et al. |
| 2009/0014326 A1 | 1/2009 | Berriah et al. |
| 2009/0020044 A1 | 1/2009 | Constantz et al. |
| 2009/0169452 A1* | 7/2009 | Constantz .......... B01D 53/1425 423/230 |
| 2009/0186244 A1* | 7/2009 | Mayer ................ H01M 8/0295 429/2 |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0108537 A1 | 5/2010 | Perego et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0076587 A1 | 3/2011 | Wang et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240483 A1 | 10/2011 | Tremblay et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2014/0315111 A1 | 10/2014 | Sato et al. |
| 2014/0353146 A1 | 12/2014 | Gilliam et al. |
| 2015/0038750 A1 | 2/2015 | Weiss et al. |
| 2015/0337443 A1 | 11/2015 | Albrecht et al. |
| 2015/0361564 A1 | 12/2015 | Albrecht et al. |
| 2016/0040304 A1 | 2/2016 | Albrecht et al. |
| 2016/0060774 A1 | 3/2016 | Gilliam et al. |
| 2016/0076156 A1 | 3/2016 | Albrecht et al. |
| 2016/0108529 A1 | 4/2016 | Albrecht et al. |
| 2016/0131612 A1 | 5/2016 | Gilliam et al. |
| 2016/0230291 A1 | 8/2016 | Albrecht et al. |
| 2016/0273116 A1 | 9/2016 | Gilliam et al. |
| 2017/0211195 A1 | 7/2017 | Fiorucci et al. |
| 2018/0002781 A1 | 1/2018 | Kawashiro et al. |
| 2018/0245226 A1 | 8/2018 | Gilliam |

FOREIGN PATENT DOCUMENTS

| | | |
|---|---|---|
| WO | WO-2008148055 A1 | 12/2008 |
| WO | WO-2009006295 A2 | 1/2009 |
| WO | WO-2009086460 A1 | 7/2009 |
| WO | WO-2009146436 A1 | 12/2009 |
| WO | WO-2009155378 A1 | 12/2009 |
| WO | WO-2010006242 A1 | 1/2010 |
| WO | WO-2010008896 A1 | 1/2010 |
| WO | WO-2010009273 A1 | 1/2010 |
| WO | WO-2010030826 A1 | 3/2010 |
| WO | WO-2010039903 A1 | 4/2010 |
| WO | WO-2010039909 A1 | 4/2010 |
| WO | WO-2010048457 A1 | 4/2010 |
| WO | WO-2010051458 A1 | 5/2010 |
| WO | WO-2010055152 A1 | 5/2010 |
| WO | WO-2010068924 A1 | 6/2010 |
| WO | WO-2010074686 A1 | 7/2010 |
| WO | WO-2010074687 A1 | 7/2010 |
| WO | WO-2010087823 A1 | 8/2010 |
| WO | WO-2010091029 A1 | 8/2010 |
| WO | WO-2010093713 A1 | 8/2010 |
| WO | WO-2010093716 A1 | 8/2010 |
| WO | WO-2010101953 A1 | 9/2010 |
| WO | WO-2010104989 A1 | 9/2010 |
| WO | WO-2010132863 A1 | 11/2010 |
| WO | WO-2010136744 A1 | 12/2010 |
| WO | WO-2011008223 A1 | 1/2011 |

(56) References Cited

FOREIGN PATENT DOCUMENTS

| WO | WO-2011017609 A1 | 2/2011 |
|---|---|---|
| WO | WO-2011038076 A1 | 3/2011 |
| WO | WO-2011049996 A1 | 4/2011 |
| WO | WO-2011066293 A1 | 6/2011 |
| WO | WO-2011075680 A1 | 6/2011 |
| WO | WO-2011081681 A1 | 7/2011 |
| WO | WO-2011097468 A2 | 8/2011 |
| WO | WO-2011102868 A1 | 8/2011 |
| WO | WO-2015071645 A1 | 5/2015 |
| WO | WO-2016016406 A1 | 2/2016 |
| WO | WO-2016148305 A1 | 9/2016 |
| WO | WO-2018156480 | 8/2018 |

OTHER PUBLICATIONS

Constantz, B. "The Risk of Implementing New Regulations on Game-Changing Technology: Sequestering CO2 in the Built Environment" AGU, Sep. 2009; 90(22), Jt. Assem, Suppl., Abstract.
International search report with written opinion dated Jun. 6, 2017 for PCT/US2017/019308.
Co-pending U.S. Appl. No. 15/338,235, filed Oct. 28, 2016.
Co-pending U.S. Appl. No. 15/341,260, filed Nov. 2, 2016.
International search report with written opinion dated Apr. 9, 2018 for PCT/US18/18695.
Mocoteguy, P et al. Long-Term Testing in Dynamic Mode of HT-PEMFC H3PO4/PBI Celtec-P Based Membrane Electrode Assmeblies for Micro-CHP Applications. Fuel Cells. Apr. 1, 2010. vol. 10. No. 2.
U.S. Appl. No. 15/900,343 Office Action dated Oct. 17, 2018.

\* cited by examiner

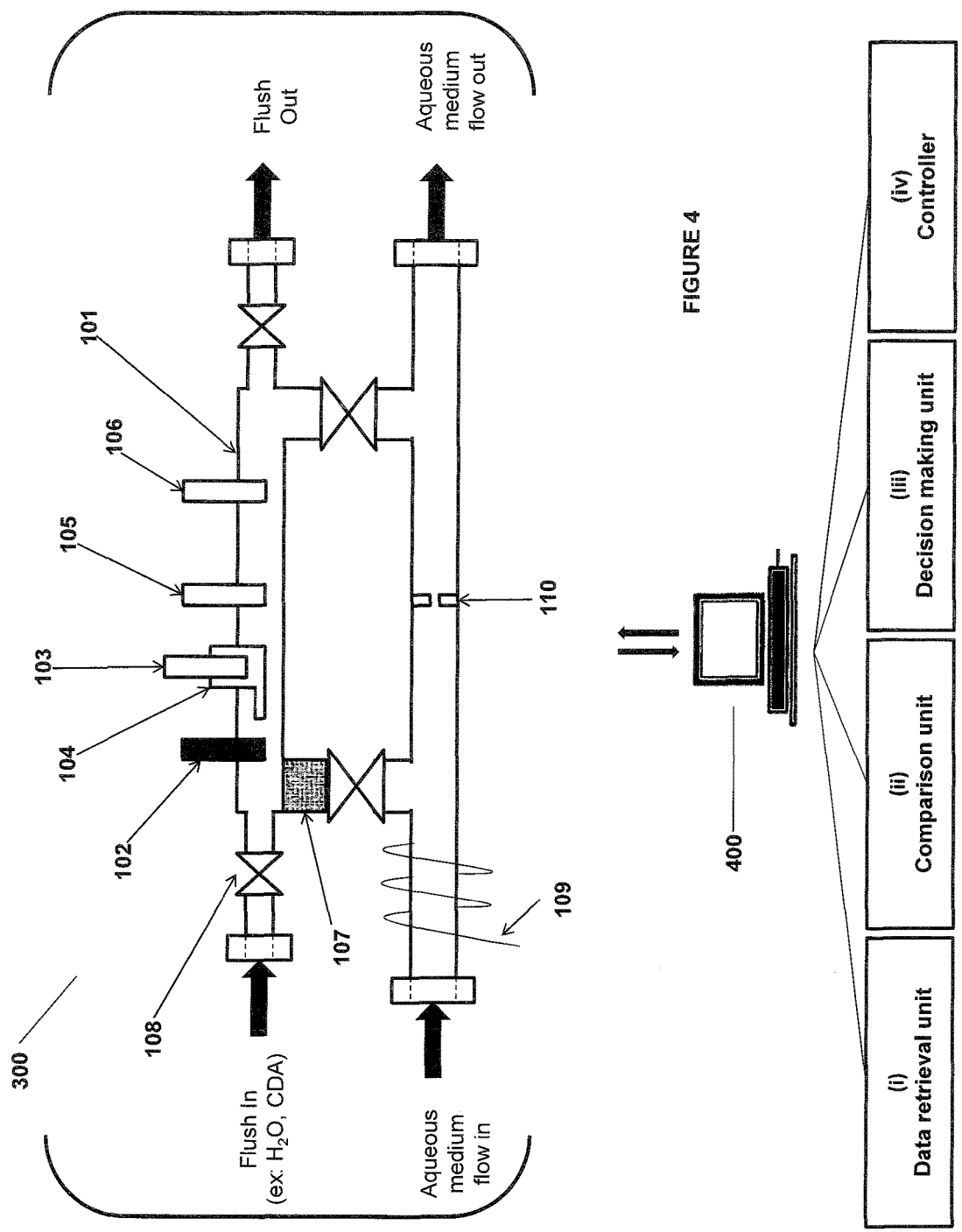

ON-LINE MONITORING OF PROCESS/SYSTEM

CROSS-REFERENCE TO RELATED APPLICATION

This application claims benefit to U.S. Provisional Patent Application No. 62/299,703, filed Feb. 25, 2016, which is incorporated herein by reference in its entirety in the present disclosure.

GOVERNMENT SUPPORT

Work described herein was made in whole or in part with Government support under Award Number: DE-FE0002472 awarded by the Department of Energy. The Government has certain rights in this invention.

BACKGROUND

The on-line monitoring of processes is gaining increasing attention and importance in both industry and academia. The on-line monitoring of the processes may provide accurate and immediate information on variables that describe the state of a reaction in the process. There is a considerable demand for on-line analytical techniques for academic research applications, process development and pilot plant operation, and monitoring of industrial manufacturing processes.

SUMMARY

In one aspect, there is provided a method for an on-line monitoring of a process, the method comprising:

A. controlling rate of oxidation of metal ions at an anode in an anode electrolyte of an electrochemical process, wherein the electrochemical process comprises oxidizing the metal ions from a lower oxidation state to a higher oxidation state at the anode, the controlling step comprising:
  determining at least one first value for at least one parameter indicative of conditions of the electrochemical process during operation; comparing each of the at least one first value with respective at least one second value indicative of desired conditions of the electrochemical process, wherein the at least one second value is in a predefined memory location; and deciding, based on the comparing, to accept, reject, and/or adjust the at least one first value for respectively the at least one parameter to control the rate of oxidation of the metal ions in the anode electrolyte of the electrochemical process;

B. controlling rate of reduction of the metal ions in a catalysis process, wherein the catalysis process comprises reacting the anode electrolyte comprising the metal ions in the higher oxidation state in the aqueous medium with an unsaturated or saturated hydrocarbon to form one or more organic compounds, the controlling step comprising:
  determining at least one first value for respectively at least one parameter, indicative of conditions of the catalysis process; comparing each of the at least one first value with respective at least one second value indicative of desired conditions of the catalysis process, wherein the at least one second value is in a predefined memory location; and deciding, based on the comparing, to accept, reject, and/or adjust the at least one first value for respectively the at least one parameter to control the rate of reduction of the metal ions in the aqueous medium of the catalysis process;

wherein the method comprises deciding the at least one second value indicative of the desired conditions of the catalysis process based on the rate of oxidation of the metal ions in the anode electrolyte of the electrochemical process and/or deciding the at least one second value indicative of the desired conditions of the electrochemical process based on the rate of reduction of the metal ions in the aqueous medium of the catalysis process.

In some embodiments of the aforementioned aspect, the controlling balances the rate of oxidation in the electrochemical process and the rate of reduction in the catalysis process to achieve steady state.

In some embodiments of the aforementioned aspect and embodiments, the method further comprises determining the at least one second value for respectively the at least one parameter indicative of desired conditions of the process and storing the at least one second value in the predefined memory location, wherein the determining the at least one second value and the storing are performed before the step of determining the at least one first value.

In some embodiments of the aforementioned aspect and embodiments, the at least one second value indicative of the desired conditions of the catalysis process is dynamic based on the rate of oxidation of the metal ions in the anode electrolyte of the electrochemical process and/or the at least one second value indicative of the desired conditions of the electrochemical process is dynamic based on the rate of reduction of the metal ions in the aqueous medium of the catalysis process.

In some embodiments of the aforementioned aspect and embodiments, the at least one parameter indicative of conditions or desired conditions of the electrochemical process comprises temperature, pressure, pH, density, ion concentration, flow rate, voltage, current, or combinations thereof.

In some embodiments of the aforementioned aspect and embodiments, the at least one parameter indicative of conditions or desired conditions of the catalysis process comprises temperature, pressure, density, ion concentration, flow rate, space time yield (STY), or combinations thereof.

In some embodiments of the aforementioned aspect and embodiments, the comparing step further comprises a computing step wherein the at least one first value is fitted into a formula to compute a third value and comparing the third value with the respective at least one second value wherein the formula is in the predefined memory location.

In some embodiments of the aforementioned aspect and embodiments, the method further comprises storing the formula in the predefined memory location, wherein the storing is performed before the step of determining and/or the step of comparing.

In some embodiments of the aforementioned aspect and embodiments, the deciding, based on the comparing, comprises adjusting the at least one first value for respectively the at least one parameter to match the at least one second value for respectively the same parameter.

In some embodiments of the aforementioned aspect and embodiments, the method further comprises after the deciding step, sending instructions to the process to continue, stop, or adjust the at least one first value for respectively the at least one parameter based on the decision.

In some embodiments of the aforementioned aspect and embodiments, the adjusting the at least one first value to match the respective at least one second value for the at least one parameter comprises sending instructions to control one or more components of the process wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value.

In some embodiments of the aforementioned aspect and embodiments, the method comprises sending the instructions manually or automatically.

In some embodiments of the aforementioned aspect and embodiments, the deciding, based on the comparing, to accept the at least one first value for respectively the at least one parameter occurs when the at least one first value is substantially same as the at least one second value.

In some embodiments of the aforementioned aspect and embodiments, the deciding, based on the comparing, to reject the at least one first value for respectively the at least one parameter occurs when the at least one first value is different from the at least one second value.

In some embodiments of the aforementioned aspect and embodiments, the decision to reject comprises sending a signal. In some embodiments, the signal is a beep, flash, or an alarm.

In some embodiments of the aforementioned aspect and embodiments, the decision to reject comprises shutting down the process.

In some embodiments of the aforementioned aspect and embodiments, the at least one parameter of the electrochemical process is metal ion concentration in the analyte exiting anode chamber and the at least one parameter of the catalysis process is metal ion concentration in the aqueous medium exiting catalysis reactor.

In some embodiments of the aforementioned aspect and embodiments, the metal ion is copper ion.

In some embodiments of the aforementioned aspect and embodiments, the metal ion is Cu(I) ion and Cu(II) ion.

In one aspect, there is provided a method for an on-line monitoring of a process, the method comprising:

A. controlling rate of oxidation of Cu ions at an anode in an anode electrolyte of an electrochemical process wherein the anode electrolyte comprises $CuCl$ and $CuCl_2$, wherein the electrochemical process comprises oxidizing $CuCl$ to $CuCl_2$ at the anode, the controlling step comprising:

determining at least one first value for concentration of $CuCl$ and/or $CuCl_2$ in the electrochemical process during operation; comparing each of the at least one first value with respective at least one second value indicative of desired concentration of $CuCl$ and/or $CuCl_2$ in the electrochemical process, wherein the at least one second value is in a predefined memory location; and deciding, based on the comparing, to accept, reject, and/or adjust the at least one first value for the concentration of $CuCl$ and/or $CuCl_2$ to control the rate of oxidation of the Cu ions in the anode electrolyte of the electrochemical process;

B. controlling rate of reduction of the Cu ions in a catalysis process, wherein the catalysis process comprises reacting the anode electrolyte comprising $CuCl$ and $CuCl_2$ in the aqueous medium with an unsaturated or saturated hydrocarbon to form one or more organic compounds, the controlling step comprising:

determining at least one first value for concentration of $CuCl$ and/or $CuCl_2$ in the catalysis process; comparing each of the at least one first value with respective at least one second value indicative of desired concentration of $CuCl$ and/or $CuCl_2$ in the catalysis process, wherein the at least one second value is in a predefined memory location; and deciding, based on the comparing, to accept, reject, and/or adjust the at least one first value for the concentration of $CuCl$ and/or $CuCl_2$ to control the rate of reduction of the Cu ions in the aqueous medium of the catalysis process;

wherein the method comprises deciding the at least one second value indicative of the desired concentration of $CuCl$ and/or $CuCl_2$ in the catalysis process based on the rate of oxidation of the Cu ions in the anode electrolyte of the electrochemical process and/or deciding the at least one second value indicative of the desired concentration of $CuCl$ and/or $CuCl_2$ in the electrochemical process based on the rate of reduction of the Cu ions in the aqueous medium of the catalysis process.

In some embodiments of the aforementioned aspect, the adjusting the at least one first value to match the respective at least one second value comprises sending instructions to control one or more components of the process wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value. In some embodiments, controlling the one or more components results in control of flow rates, temperature, pressure, density, etc. (other parameters listed herein) thereby resulting in adjustment of the at least one first value of the concentration of $CuCl$ and/or $CuCl_2$.

In another aspect there is provided a unit for an on-line monitoring of a system, the unit comprising:

a control unit configured to calculate and control rate of oxidation of metal ions at an anode in an anode electrolyte of an electrochemical system, wherein the electrochemical system comprises an anode chamber comprising an anode in contact with an anode electrolyte wherein the anode electrolyte comprises metal ions in an aqueous medium and wherein the anode is configured to oxidize the metal ions from a lower oxidation state to a higher oxidation state; and the control unit configured to calculate and control rate of reduction of the metal ions in a catalysis system, wherein the catalysis system comprises a reactor operably connected to the electrochemical system and configured to react the metal ions in the higher oxidation state in the aqueous medium with an unsaturated or saturated hydrocarbon to form one or more organic compounds;

a data retrieval unit operably connected to the control unit and configured to determine at least one first value for respectively at least one parameter indicative of conditions of the electrochemical system and the catalysis system;

a comparison unit operably connected to the data retrieval unit and configured to compare the at least one first value with respective at least one second value for respectively the at least one parameter for respective system, wherein the at least one second value is in a predefined memory location in the comparison unit; and a decision making unit operably connected to the comparison unit and configured to accept, reject, and/or adjust the at least one first value for respectively the at least one parameter for the respective system based on the comparison by the comparison unit, wherein the control unit is configured to decide the at least one second value for the at least one parameter indicative of the desired conditions of the catalysis system based on the calculated rate of oxidation of the metal ions in the anode electrolyte of the electrochemical system and/or deciding the at least one second value for the at least one parameter indicative of the desired conditions of the electrochemical system based on the calculated rate of reduction of the metal ions in the aqueous medium of the catalysis system.

In another aspect there is provided a unit for an on-line monitoring of a system, the unit comprising:

a control unit configured to calculate and control rate of oxidation of Cu ions at an anode in an anode electrolyte of an electrochemical system, wherein the electrochemical system comprises an anode chamber comprising an anode in contact with an anode electrolyte wherein the anode electrolyte comprises CuCl and $CuCl_2$ in an aqueous medium and wherein the anode is configured to oxidize CuCl to $CuCl_2$; and the control unit configured to calculate and control rate of reduction of the Cu ions in a catalysis system, wherein the catalysis system comprises a reactor operably connected to the electrochemical system and configured to react $CuCl_2$ in the aqueous medium with an unsaturated or saturated hydrocarbon to form one or more organic compounds and CuCl;

a data retrieval unit operably connected to the control unit and configured to determine at least one first value for concentration of CuCl and/or $CuCl_2$ in the electrochemical system and the catalysis system;

a comparison unit operably connected to the data retrieval unit and configured to compare the at least one first value with respective at least one second value for the concentration of CuCl and/or $CuCl_2$ for respective system, wherein the at least one second value is in a predefined memory location in the comparison unit; and a decision making unit operably connected to the comparison unit and configured to accept, reject, and/or adjust the at least one first value for the concentration of CuCl and/or $CuCl_2$ for the respective system based on the comparison by the comparison unit, wherein the control unit is configured to decide the at least one second value for the concentration of CuCl and/or $CuCl_2$ indicative of the desired conditions of the catalysis system based on the calculated rate of oxidation of the Cu ions in the anode electrolyte of the electrochemical system and/or deciding the at least one second value for the concentration of CuCl and/or $CuCl_2$ indicative of the desired conditions of the electrochemical system based on the calculated rate of reduction of the Cu ions in the aqueous medium of the catalysis system.

In some embodiments of the aforementioned aspect and embodiments, the control unit is configured to balance the rate of oxidation in the electrochemical system and the rate of reduction in the catalysis system to achieve steady state.

In some embodiments of the aforementioned aspect and embodiments, the control unit is configured to decide the at least one second value for the at least one parameter indicative of the desired conditions of the catalysis system in real time based on the calculated rate of oxidation of the metal ions in the anode electrolyte of the electrochemical system and/or deciding the at least one second value for the at least one parameter indicative of the desired conditions of the electrochemical system in real time based on the calculated rate of reduction of the metal ions in the aqueous medium of the catalysis system.

In some embodiments of the aforementioned aspect and embodiments, the data retrieval unit is configured to determine the at least one first value for respectively the at least one parameter from one or more analytical components selected from the group consisting of temperature probe, pressure probe, pH meter, oxidation-reduction potential (ORP) probe, quadruple mass spectrometer (QMS), ATR probe, ultramicroelectrode (UME) probe, gas chromatography (GC), titrator, inductively coupled plasma (ICP), total organic carbon (TOC) meter, electrochemical sensor, volatile organic compound (VOC) sensor, lower explosion limit (LEL) sensor, coriolis flow meter, and combinations thereof.

In some embodiments of the aforementioned aspect and embodiments, the at least one parameter of the electrochemical system comprises temperature, pressure, pH, density, ion concentration, flow rate, voltage, current, or combinations thereof. In some embodiments of the aforementioned aspect and embodiments, the at least one parameter of the catalysis system comprises temperature, pressure, density, ion concentration, flow rate, space time yield (STY), or combinations thereof.

In some embodiments of the aforementioned aspect and embodiments, the control unit further comprises a computing unit wherein the computing unit fits the data received from the data retrieval unit into a formula in the predefined memory location to calculate the rate of oxidation and/or the rate of reduction of the metal ions.

In some embodiments of the aforementioned aspect and embodiments, the control unit is also configured to decide the at least one second value for respectively the at least one parameter indicative of desired conditions of the electrochemical and the catalysis system based on the rate of the reduction of the metal ions or the rate of oxidation of the metal ions, respectively, and to send the at least one second value to the comparison unit for storing in the predefined memory location.

In some embodiments of the aforementioned aspect and embodiments, the comparison unit further comprises a computing unit wherein the computing unit fits the at least one first value into a formula in the predefined memory location to compute a third value and the comparing unit is configured to compare the third value with the respective at least one second value.

In some embodiments of the aforementioned aspect and embodiments, the decision making unit is configured to accept the at least one first value for respectively the at least one parameter when the at least one first value is substantially same as the at least one second value.

In some embodiments of the aforementioned aspect and embodiments, the decision making unit is configured to reject the at least one first value for respectively the at least one parameter when the at least one first value is different from the at least one second value.

In some embodiments of the aforementioned aspect and embodiments, the decision making unit is configured to send a signal to demonstrate the rejection.

In some embodiments of the aforementioned aspect and embodiments, the decision making unit is configured to beep, flash, or ring an alarm.

In some embodiments of the aforementioned aspect and embodiments, the decision making unit is configured to shut down the system.

In some embodiments of the aforementioned aspect and embodiments, the method further comprises an instruction unit operably connected to the decision making unit and configured to send instructions to the electrochemical system and/or the catalysis system based on the decision of the decision making unit.

In some embodiments of the aforementioned aspect and embodiments, the instruction unit operates automatically or manually.

In some embodiments of the aforementioned aspect and embodiments, the instruction unit is configured to send instructions to the electrochemical system and/or the catalysis system to adjust the at least one first value for respectively the at least one parameter to match the at least one second value.

In some embodiments of the aforementioned aspect and embodiments, the instruction unit is configured to send instructions to control one or more components of the electrochemical system and/or the catalysis system wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value for respectively the at least one parameter to match the respective at least one second value.

In some embodiments of the aforementioned aspect and embodiments, the method further comprises a monitor screen to display the at least one first value for respectively the at least one parameter.

In some embodiments of the aforementioned aspect and embodiments, the monitor screen displays the at least one first value for respectively the at least one parameter with respect to the location of the parameter in the system.

In some embodiments of the aforementioned aspect and embodiments, the monitor screen displays one or more components of the system selected from the group consisting of one or more valves, one or more pumps, one or more compressors, one or more heat exchange units, one or more heaters or coolers, power source, rectifier, one or more tanks, and combinations thereof.

In some embodiments of the aforementioned aspect and embodiments, the monitor screen is a touch screen.

In one aspect, there is provided a computer program product encoded on a non-transitory computer-readable medium, which when executed, causes a computer to perform an on-line monitoring of a system, the computer program product comprising:
instructions executable to calculate and control rate of oxidation of metal ions at an anode in an anode electrolyte of an electrochemical system; and to calculate and control rate of reduction of the metal ions in a catalysis system,
  wherein the electrochemical system comprises an anode chamber comprising an anode in contact with an anode electrolyte wherein the anode electrolyte comprises metal ions in an aqueous medium and wherein the anode is configured to oxidize the metal ions from a lower oxidation state to a higher oxidation state, and wherein the catalysis system comprises a reactor operably connected to the electrochemical system and configured to react the metal ions in the higher oxidation state in the aqueous medium with an unsaturated or saturated hydrocarbon to form one or more organic compounds;
instructions executable to retrieve at least one first value for respectively at least one parameter indicative of conditions of the electrochemical system and the catalysis system;
instructions executable to compare each of the at least one first value with respective at least one second value for respectively the at least one parameter for respective system, wherein the at least one second value is predefined;
instructions executable to make a decision to accept, reject, and/or adjust the at least one first value for respectively the at least one parameter based on the comparison; and
instructions executable to decide the at least one second value for the at least one parameter indicative of the desired conditions of the catalysis system based on the calculated rate of oxidation of the metal ions in the anode electrolyte of the electrochemical system and/or instructions executable to decide the at least one second value for the at least one parameter indicative of the desired conditions of the electrochemical system based on the calculated rate of reduction of the metal ions in the aqueous medium of the catalysis system.

In some embodiments of the aforementioned aspect, the product further comprises based on the decision, instructions executable to send instructions to the system to continue, stop, and/or adjust the at least one first value for respectively the at least one parameter.

In one aspect, there is provided a computer program product encoded on a non-transitory computer-readable medium, which when executed, causes a computer to perform an on-line monitoring of a system, the computer program product comprising:
instructions executable to calculate and control rate of oxidation of Cu ions at an anode in an anode electrolyte of an electrochemical system; and to calculate and control rate of reduction of the Cu ions in a catalysis system,
  wherein the electrochemical system comprises an anode chamber comprising an anode in contact with an anode electrolyte wherein the anode electrolyte comprises CuCl and $CuCl_2$ in an aqueous medium and wherein the anode is configured to oxidize CuCl to $CuCl_2$, and wherein the catalysis system comprises a reactor operably connected to the electrochemical system and configured to react $CuCl_2$ in the aqueous medium with an unsaturated or saturated hydrocarbon to form one or more organic compounds and CuCl;
instructions executable to retrieve at least one first value for concentration of CuCl and/or $CuCl_2$ in the electrochemical system and the catalysis system;
instructions executable to compare each of the at least one first value with respective at least one second value for the concentration of CuCl and/or $CuCl_2$ in the respective system, wherein the at least one second value is predefined;
instructions executable to make a decision to accept, reject, and/or adjust the at least one first value for the concentration of CuCl and/or $CuCl_2$ based on the comparison; and
instructions executable to decide the at least one second value for the concentration of CuCl and/or $CuCl_2$ indicative of the desired conditions of the catalysis system based on the calculated rate of oxidation of the Cu ions in the anode electrolyte of the electrochemical system and/or instructions executable to decide the at least one second value for the concentration of CuCl and/or $CuCl_2$ indicative of the desired conditions of the electrochemical system based on the calculated rate of reduction of the Cu ions in the aqueous medium of the catalysis system.

In some embodiments of the aforementioned aspect, the product further comprises based on the decision, instructions executable to send instructions to the system to continue, stop, and/or adjust the at least one first value for concentration of CuCl and/or $CuCl_2$.

In some embodiments of the aforementioned aspect and embodiments, the product further comprises based on the decision, instructions executable to send instructions to the system to control one or more components of the electrochemical system and/or the catalysis system wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value.

In some embodiments of the aforementioned aspect and embodiments, the computer program product further comprises instructions executable to balance the rate of oxidation in the electrochemical system and the rate of reduction in the catalysis system to achieve steady state.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

FIG. 4 is an illustration of some embodiments of the on-line monitoring of the UME described herein.

DETAILED DESCRIPTION

Figure 1:
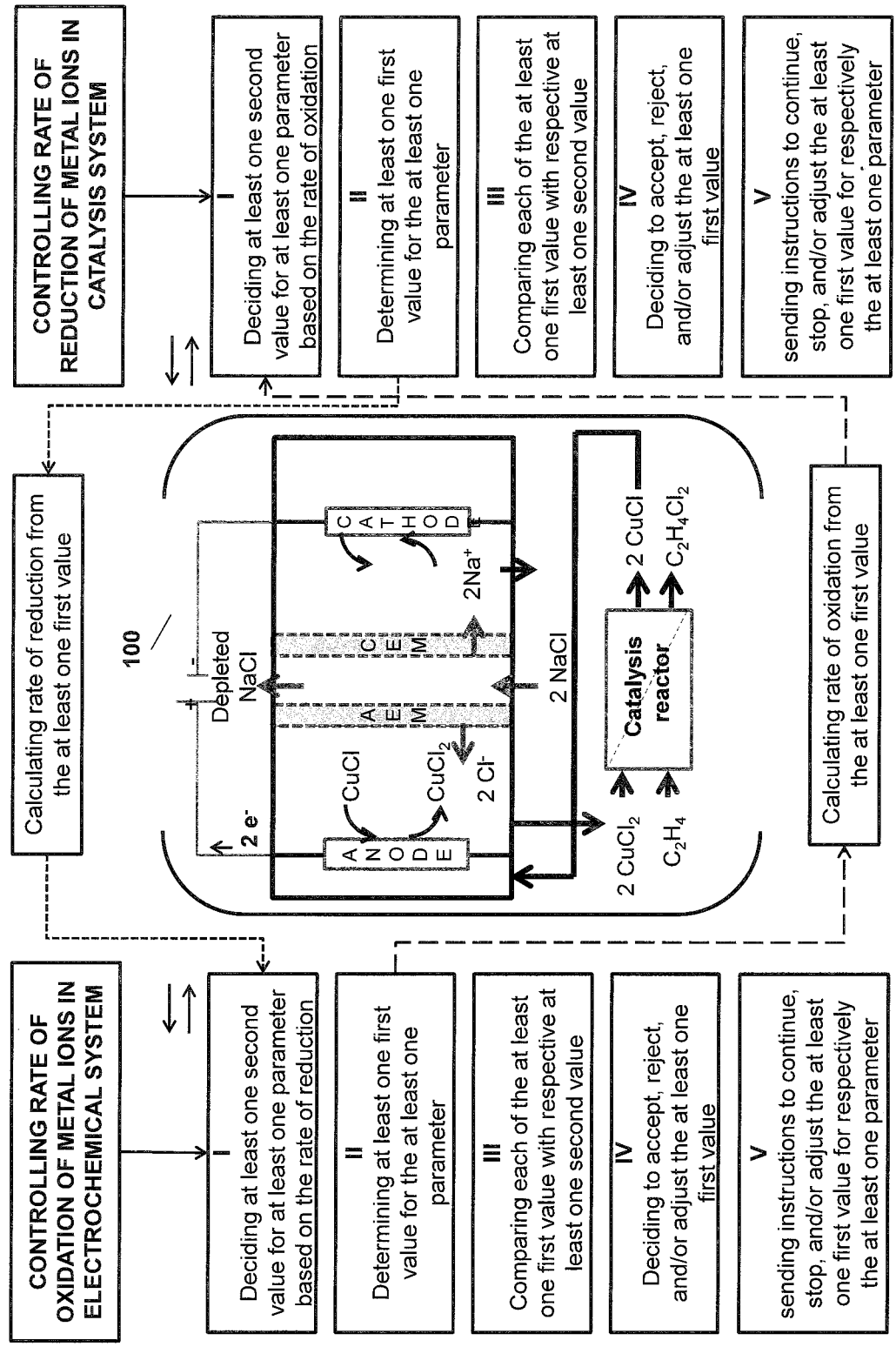
FIG. 1 is an illustration of some embodiments of the on-line monitoring methods and systems described herein.

Disclosed herein are systems and methods that relate to an on-line monitoring of systems and processes including, but not limited to, an on-stream and on-reactor application of analytical methods and techniques to monitor chemical composition of various streams, conduct an on-line analysis of physical parameters (temperature, pressure, level, density, viscosity, etc.), to identify process-related chemical species and environment, to quantify the concentration of reaction ingredients, products and byproducts, and to instruct the systems to turn-on, turn-off or adjust the components to optimize the process conditions in order to balance the rate of oxidation in the electrochemical system and the rate of reduction in the catalysis system to achieve steady state between the electrochemical and catalysis system/process.

Before the present invention is described in greater detail, it is to be understood that this invention is not limited to particular embodiments described, as such may, of course, vary. It is also to be understood that the terminology used herein is for the purpose of describing particular embodiments only and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges that are presented herein with numerical values may be construed as "about" numerical. The "about" is to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

On-Line Monitoring of the Process/System

Provided herein are the systems and methods that relate to the on-line monitoring of a chemical process. The "on-line monitoring" as used herein includes real time retrieval and analysis of data related to a process/system and dynamic control of the process/system to ensure desired operation.

The on-line monitoring process supplies process information in real time that enables efficient monitoring and process control. While the on-line monitoring process may be fully or partially automated, the process may involve off-line techniques where the sample may be transported to a remote or centralized laboratory for analysis. In some embodiments of the methods and systems provided herein, the on-line monitoring process is fully automated. In some embodiments of the methods and systems provided herein, the on-line monitoring process is partially automated.

The on-line monitoring of the process described herein can provide several advantages including but not limited to, steady state operation, improved product quality and consistency, increased efficiency of the process, ensure safe reactor operation by monitoring process and reactor parameters, understanding fundamentals of the reaction itself, saving time for analysis and sample transport, reducing emissions by avoiding sample withdrawal and transport, reducing costs of labor, raw materials, off spec products, and process waste.

Accordingly, in one aspect there are provided methods for an on-line monitoring of a process comprising:

A. controlling rate of oxidation of metal ions at an anode in an anode electrolyte of an electrochemical process, wherein the electrochemical process comprises oxidizing the metal ions from a lower oxidation state to a higher oxidation state at the anode, the controlling step comprising:
  determining at least one first value for at least one parameter indicative of conditions of the electrochemical process during operation; comparing each of the at least one first value with respective at least one second value indicative of desired conditions of the electrochemical process, wherein the at least one second value is in a predefined memory location; and deciding, based on the comparing, to accept, reject, and/or adjust the at least one first value for respectively the at least one parameter to control the rate of oxidation of the metal ions in the anode electrolyte of the electrochemical process;
B. controlling rate of reduction of the metal ions in a catalysis process, wherein the catalysis process comprises reacting the anode electrolyte comprising the metal ions in the higher oxidation state in the aqueous medium with an unsaturated or saturated hydrocarbon to form one or more organic compounds, the controlling step comprising:
  determining at least one first value for respectively at least one parameter, indicative of conditions of the catalysis process; comparing each of the at least one first value with respective at least one second value indicative of desired conditions of the catalysis process, wherein the at least one second value is in a predefined memory location; and deciding, based on the comparing, to accept, reject, and/or adjust the at least one first value for respectively the at least one parameter to control the rate of reduction of the metal ions in the aqueous medium of the catalysis process;
  wherein the method comprises deciding the at least one second value indicative of the desired conditions of the catalysis process based on the rate of oxidation of the metal ions in the anode electrolyte of the electrochemical process and/or deciding the at least one second value indicative of the desired conditions of the electrochemical process based on the rate of reduction of the metal ions in the aqueous medium of the catalysis process.

Accordingly, there are provided control units and systems to carry out the methods of the aforementioned aspect.

FIG. 1 illustrates a process or a system 100 that is subjected to the on-line monitoring process. The process is a combination of two processes: an electrochemical process and a catalysis process which have been described in detail in U.S. Pat. No. 9,187,834, issued Nov. 17, 2015; U.S. Pat. No. 9,200,375, issued Dec. 1, 2015; and U.S. patent application Ser. No. 14/446,791, filed Jul. 30, 2014, all of which are incorporated herein by reference in their entireties in this application. Before describing the process 100 in detail, provided below is the description of the on-line monitoring process.

In some embodiments of the aforementioned aspects and embodiments, the methods described herein relate to the on-line monitoring of the process 100. The process 100 is a combination of two processes, the electrochemical process and the catalysis process. The electrochemical process comprises oxidizing the metal ions from a lower oxidation state to a higher oxidation state at the anode in the anode electrolyte and the catalysis process comprises reacting the anode electrolyte comprising the metal ions in the higher oxidation state in the aqueous medium with an unsaturated or saturated hydrocarbon to form one or more organic compounds. The on-line monitoring methods and systems provided herein not just monitor the process but allow two completely separate processes, like electrochemistry and catalysis, to stay in balance.

In the process 100, we may not set the process conditions for the electrochemical cell and the catalysis reactor independently as any slight deviation in operating conditions or parameters may eventually lead to an imbalance in the two systems and a large upset over time. In the methods and systems provided herein, the operating conditions or parameters of either the electrochemical cell or the catalysis reactor are set and based on the rate of the oxidation in the electrochemical cell or the rate of the reduction in the catalysis system, the operating conditions of the other system are monitored and controlled in order to keep the two systems operating at a steady state. In some embodiments, the monitoring is in real time and the setting up of the operating conditions/parameters may be dynamic based on the rate of the oxidation in the electrochemical cell or the rate of the reduction in the catalysis system.

As illustrated in FIG. 1, the method includes controlling rate of oxidation of metal ions at an anode in an anode electrolyte of an electrochemical process by determining at least one first value for at least one parameter indicative of conditions of the electrochemical process during operation (II); comparing each of the at least one first value with respective at least one second value indicative of desired conditions of the electrochemical process, wherein the at least one second value is in a predefined memory location (III); and deciding, based on the comparing, to accept, reject, and/or adjust the at least one first value for respectively the at least one parameter (IV) to control the oxidation of the metal ions in the anode electrolyte of the electrochemical process. The method also includes deciding the at least one second value indicative of the desired conditions of the electrochemical process based on the rate of reduction of the metal ions in the aqueous medium of the catalysis process ((I) and illustrated by dotted arrow).

Similarly, also as illustrated in FIG. 1, the method includes controlling rate of reduction of the metal ions in a catalysis process comprising determining at least one first value for respectively at least one parameter, indicative of conditions of the catalysis process (II); comparing each of the at least one first value with respective at least one second value indicative of desired conditions of the catalysis process, wherein the at least one second value is in a predefined memory location (III); and deciding, based on the comparing, to accept, reject, and/or adjust the at least one first value for respectively the at least one parameter (IV) to control the reduction of the metal ions in the aqueous medium of the catalysis process. The method also includes deciding the at least one second value indicative of the desired conditions of the catalysis process based on the rate of oxidation of the metal ions in the anode electrolyte of the electrochemical process ((I) and illustrated by dashed arrow).

In some embodiments of the aforementioned methods, the controlling step balances the rate of oxidation in the electrochemical process and the rate of reduction in the catalysis process to achieve steady state.

In some embodiments of the aforementioned methods, the at least one second value indicative of the desired conditions of the catalysis process is dynamic based on the rate of oxidation of the metal ions in the anode electrolyte of the electrochemical process and/or the at least one second value indicative of the desired conditions of the electrochemical process is dynamic based on the rate of reduction of the metal ions in the aqueous medium of the catalysis process.

In some embodiments of the aforementioned aspects and embodiments, the at least one parameter indicative of conditions or desired conditions of the electrochemical process includes, but not limited to, temperature, pressure, pH, density, ion concentration, flow rate, voltage, current, or combinations thereof. In some embodiments of the aforementioned aspects and embodiments, the at least one parameter indicative of conditions or desired conditions of the catalysis process includes, but not limited to, temperature, pressure, density, ion concentration, flow rate, space time yield (STY), or combinations thereof. In some embodiments of the aforementioned aspects and embodiments, in order to determine the at least one first value for respectively the at least one parameter, the value is obtained from one or more analytical components of the system described herein below.

For example only, in some embodiments, if current density of the electrochemical cell is set to target a certain production rate of caustic in the cathode chamber, then that current may also dictate the amount of metal ions oxidized at the anode. Then comparing the amount that may get oxidized with the flow rates in and out of the anode compartment and the data obtained from UME (or equivalent and other analytical techniques), the control unit may be able to calculate the efficiency of the anode and the rate of oxidation of the metal ions at the anode. Using this data, the control unit may decide at least one second value for the at least one parameter for the catalysis process indicative of the desired conditions of the catalysis process to ensure that the same amount of metal ions that were oxidized in the electrochemical cell at the anode, are then reduced in catalysis. The monitoring method/system can decide the at least one second value of at least one parameter in the catalysis in multiple ways to balance the rate of oxidation and reduction. The monitoring method/system may increase or decrease parameters such as, but not limited to, the flow rates, increase or decrease the feed temperature to the catalysis reactor, or increase or decrease the pressure in the catalysis reactor, etc.

In some embodiments, as the flow rates in electrochemical process may be different from catalysis (e.g. low conversion per pass and high flow rates in electrochemistry versus low flow rates and high conversion per pass in catalysis or vice versa), the control unit may monitor the flow rates in catalysis and the UME data (or equivalent and other analytical techniques) to determine the rate of reduction of the metal ions. The control unit and the on-line monitoring process can thus ensure that the rate of oxidation and the rate of reduction are in balance such that the acolyte can stay at steady state concentrations and not drift overtime. For example only, if the catalysis process needs to produce a certain amount of ethylene dichloride (an example of the organic compound), then the monitoring method/system may set the temperature, pressure, or any other relevant parameter of the catalysis reactor to produce a certain amount of EDC. Then, using the data related to the parameters such as, flow rates, STY, density, temperature, pressure, etc. the control unit determines the rate of reduction of the metal ions in the catalysis process. Using this data, the control unit may decide the at least one second value for the at least one parameter for the electrochemical process indicative of the desired conditions of the electrochemical process to ensure that the same amount of metal ions that were reduced in the catalysis, are oxidized in the electrochemical cell at the anode. The monitoring method/system can decide the at least one second value of at least one parameter in the electrochemical process in multiple ways to balance the rate of oxidation and reduction. The monitoring method/system may increase or decrease parameters such as, but not limited to, the flow rates, increase or decrease the temperature of the electrochemical process, or increase or decrease the pressure in the electrochemical process, increase or decrease the current density, etc.

In some embodiments, the method/system determines at least one first value for at least one parameter indicative of conditions of the electrochemical process or the catalysis process continuously throughout the process to make sure that all the parameters are operating as desired. In some embodiments, as the parameters of the electrochemical process and the catalysis process may result in the drift of the rate of oxidation and reduction, the at least one second value indicative of the desired conditions of the electrochemical process and the catalysis process is decided dynamically depending on the status of the rate of oxidation and reduction during the processes.

In some embodiments, the rate of oxidation and reduction may also be monitored based on the amount of water (affecting the density and the concentration in the analyte or the aqueous medium) in the systems. As the electrochemical process and the catalysis process are run with one re-circulating analyte/anode electrolyte, a small change in the concentration of the ions in the analyte may affect both processes. For example only, the amount of water crossing over the ion exchange membrane into the analyte in the electrochemical cell, may need to be removed at the same rate somewhere else in the process—e.g. directly in catalysis through the amount of water being removed with the EDC, to active distillation/removal of the water from the system. The analytical techniques, such as without limitation, flow meters, density meters, etc. may be used to determine the parameter such as the density or concentration or the amount of water being added to the analyte through the ion exchange membrane. The monitoring method/system may then adjust the amount of distillation of water (through pressure, temperature, etc.), to ensure the same amount of water is removed from the system.

Accordingly, there is provided a method for an on-line monitoring of a process, the method comprising:

A. controlling rate of oxidation of Cu ions at an anode in an anode electrolyte of an electrochemical process wherein the anode electrolyte comprises $CuCl$ and $CuCl_2$, wherein the electrochemical process comprises oxidizing $CuCl$ to $CuCl_2$ at the anode, the controlling step comprising:
  determining at least one first value for concentration of $CuCl$ and/or $CuCl_2$ in the electrochemical process during operation; comparing each of the at least one first value with respective at least one second value indicative of desired concentration of $CuCl$ and/or $CuCl_2$ in the electrochemical process, wherein the at least one second value is in a predefined memory location; and deciding, based on the comparing, to accept, reject, and/or adjust the at least one first value for the concentration of $CuCl$ and/or $CuCl_2$ to control the rate of oxidation of the Cu ions in the anode electrolyte of the electrochemical process;

B. controlling rate of reduction of the Cu ions in a catalysis process, wherein the catalysis process comprises reacting the anode electrolyte comprising $CuCl$ and $CuCl_2$ in the aqueous medium with an unsaturated or saturated hydrocarbon to form one or more organic compounds, the controlling step comprising:
  determining at least one first value for concentration of $CuCl$ and/or $CuCl_2$ in the catalysis process; comparing each of the at least one first value with respective at least one second value indicative of desired concentration of CuCl and/or $CuCl_2$ in the catalysis process, wherein the at least one second value is in a predefined memory location; and deciding, based on the comparing, to accept, reject, and/or adjust the at least one first value for the concentration of CuCl and/or $CuCl_2$ to control the rate of reduction of the Cu ions in the aqueous medium of the catalysis process;
wherein the method comprises deciding the at least one second value indicative of the desired concentration of CuCl and/or $CuCl_2$ in the catalysis process based on the rate of oxidation of the Cu ions in the anode electrolyte of the electrochemical process and/or deciding the at least one second value indicative of the desired concentration of CuCl and/or $CuCl_2$ in the electrochemical process based on the rate of reduction of the Cu ions in the aqueous medium of the catalysis process.

In some embodiments of the aforementioned aspects and embodiments, the temperature parameter may be the temperature in any component of the process. For example, the temperature can be of the liquid streams in the electrochemical cell, of the liquid streams in the reactor, of the gaseous feed stock, of the gaseous products/byproducts, of the components of the process such as valves, pumps, compressors, etc. In some embodiments of the aforementioned aspects and embodiments, the pressure parameter is the gauge pressure in any component of the process. For example, the pressure in the electrochemical cell, the pressure in the reactor, and/or the pressure in the components of the process such as valves, pumps, compressors, etc. For example only, the pressure gauge may help in determining the differential pressure i.e. the pressure drop across the bed of the reactor and/or to measure liquid level in vessels. In some embodiments of the aforementioned aspects and embodiments, the parameter is weight which includes, without limitation, the weight of the feed stock, weight of the product and/or by product formed. In some embodiments of the aforementioned aspects and embodiments, the parameter is level which includes, without limitation, the level of different liquids or fluids in the tanks, vessels, conduits, pipes, etc. In some embodiments of the aforementioned aspects and embodiments, the density, pH, ion concentration, flow rate, etc. can be of fluids and gases in and out of the electrochemical cell, fluids and gases in and out of the reactor, and/or fluids and gases flowing through the conduits. In some embodiments of the aforementioned aspects and embodiments, the voltage and current may be the voltage and current related to the electrochemical cell. In some embodiments of the aforementioned aspects and embodiments, the power may be the power supplied to the components of the process.

In some embodiments of the aforementioned aspects and embodiments, the monitoring method further includes comparing each of the at least one first value with respective at least one second value, wherein the at least one second value is in a predefined memory location (step III in FIG. 1).

In some embodiments of the aforementioned aspects and embodiments, the method further includes deciding the at least one second value for respectively the at least one parameter indicative of desired conditions of the electrochemical process based on the rate of reduction of the metal ions in the aqueous medium of the catalysis process or deciding the at least one second value for respectively the at least one parameter indicative of desired conditions of the catalysis process based on the rate of oxidation of the metal ions in the analyte of the electrochemical process and storing the at least one second value in the predefined memory location (step I in FIG. 1). In some embodiments, the deciding the at least one second value and the storing are performed before the step of determining the at least one first value (step II). In some embodiments, the deciding comprises adjusting the at least one first value for respectively the at least one parameter to match the at least one second value for respectively the same parameter.

In some embodiments, the controlling of the rate of oxidation or the rate of reduction of the metal ions comprises computing or calculating step wherein the at least one first value for the at least one parameter of the process is fitted into a formula to compute or calculate the rate of oxidation or the rate of reduction of the metal ions.

At the comparing step III, the at least one first value may be compared directly with the respective at least one stored second value or the comparing step comprises a computing step wherein the at least one first value is fitted into a formula to compute a third value and the third value is then compared with the respective at least one second value wherein the formula is also in the predefined memory location. For the aforementioned computation, the method further comprises storing the formula in the predefined memory location, wherein the storing is performed before the step of determining the at least one first and/or the second value and/or the step of comparing.

After the comparison of the at least one first value/third value with respective at least one stored second value of the one or more parameters, in some embodiments of the aforementioned aspects and embodiments, the method further includes deciding step IV, based on the comparing, to accept, reject, and/or adjust the at least one first value for respectively the at least one parameter in the electrochemical process and/or catalysis process.

In some embodiments of the aforementioned aspects and embodiments, the method further includes after the deciding step, sending instructions V to the process to continue, stop, and/or adjust the at least one first value for respectively the at least one parameter based on the decision. The instructions may be sent manually, digitally, or automatically.

In some embodiments of the aforementioned aspects and embodiments, the decision to accept the at least one first value for respectively the at least one parameter may occur when the at least one first value is substantially same as the at least one second value. In some embodiments, the decision to accept may not result in any change in the process or the instructions sent to the process are to continue the process.

In some embodiments of the aforementioned aspects and embodiments, the decision to reject the at least one first value for respectively the at least one parameter may occur when the at least one first value is different from the at least one second value. In some embodiments, the decision to reject may result in an instruction to stop the process. In some embodiments of the aforementioned aspects and embodiments, the decision to reject may be demonstrated in the form of a signal such as, but not limited to, beep, flash, or an alarm. In some embodiments of the aforementioned aspects and embodiments, the decision to reject comprises shutting down the process 100 or the process as described herein.

In some embodiments of the aforementioned aspects and embodiments, the decision to adjust the at least one first value to match the respective at least one second value for the at least one parameter may result in sending of the instructions comprising adjusting the at least one first value for respectively the at least one parameter to match the respective at least one second value. The instructions may be sent to the process manually, digitally, or automatically to control one or more components of the process wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value.

In some embodiments of the aforementioned aspects and embodiments, the on-line monitoring process is fully automated. In some embodiments of the aforementioned aspects and embodiments, the on-line monitoring process is partially automated. In some embodiments of the aforementioned aspects and embodiments, the whole on-line monitoring process is fully automated except for the step of sending instructions to the process where the process may be manual, digital, or automated depending on the parameter to be adjusted.

For example, in the on-line monitoring of the process 100, a temperature and pressure first value of the electrochemical process and/or the catalysis process may be determined. The temperature and pressure first value may be compared to the stored second value of the temperature and pressure. If the temperature and pressure first value matches the stored second value then no instructions are sent to the process or an instruction to continue is sent to the process. If the temperature and pressure first value does not match the stored second value, e.g. by a wide margin, then an instruction may be sent to shut down the process such as a ring, bell, or alarm or the on-line monitoring system may shut down the process automatically. If the temperature and pressure first value does not match the stored second value e.g. by a small margin, then an instruction may be sent to the process to adjust one or more of the components of the process to adjust the temperature or pressure value. For example, an instruction may be sent manually, digitally, or automatically to one or more valves to adjust the flow of the streams, one or more pumps, one or more compressors, one or more heat exchange units, and/or one or more heaters or coolers to turn-on/off or open/close to increase or decrease the temperature or pressure value of the process. In some embodiments of the aforementioned aspects and embodiments, the instructions may be sent to a specific location of the one or more components in order to selectively increase or decrease the temperature or pressure value at that specific location.

In some embodiments, instructions may be sent to adjust the value of one parameter in order to effect a change in the value of the other parameter. For example, in the on-line monitoring of the process 100, a first value of the yield of the product (e.g. ethylene dichloride) may be determined using gas chromatography. The value of the yield of the product may be compared to the stored second value of the yield of the product. In some embodiments, the yield of the product may be computed by the system after receiving the value from gas chromatography (GC) and then compared to the stored second value of the yield of the product. If the value of the yield of the product matches the stored second value then no instructions are sent to the process or an instruction to continue is sent to the process. If the value of the yield of the product does not match the stored second value, e.g. by a small or a wide margin, then an instruction may be sent to shut down the process manually such as a ring, bell, or alarm or the on-line monitoring system may shut down the process automatically. If the value of the yield of the product does not match the stored second value e.g. by a small or wide margin, then an instruction may be sent to the process to adjust one or more of the components of the process to adjust the value of the yield of the product. For example, an instruction may be sent to open/close or turn-on/off one or more valves to adjust the flow of the gaseous and/or liquid streams, one or more pumps, one or more compressors, one or more heat exchange units, and/or one or more heaters or coolers in order to increase or decrease one or more of the parameters such as, the temperature, pressure, differential pressure, weight, level, density, pH, ion concentration, flow rate, residence time, voltage, current, power, and combinations thereof which in turn may adjust the value of the yield of the product. In some embodiments of the aforementioned aspects and embodiments, the instructions may be sent to a specific location of the component in order to selectively increase or decrease the parameter value at that specific location.

The components may be manually, mechanically, digitally, or automatically controlled, or may employ any other convenient flow regulator protocol.

In one aspect, there is provided a unit for an on-line monitoring of a system, the unit comprising:

a control unit configured to calculate and control rate of oxidation of metal ions at an anode in an anode electrolyte of an electrochemical system, wherein the electrochemical system comprises an anode chamber comprising an anode in contact with an anode electrolyte wherein the anode electrolyte comprises metal ions in an aqueous medium and wherein the anode is configured to oxidize the metal ions from a lower oxidation state to a higher oxidation state; and the control unit configured to calculate and control rate of reduction of the metal ions in a catalysis system, wherein the catalysis system comprises a reactor operably connected to the electrochemical system and configured to react the metal ions in the higher oxidation state in the aqueous medium with an unsaturated or saturated hydrocarbon to form one or more organic compounds;

a data retrieval unit operably connected to the control unit and configured to determine at least one first value for respectively at least one parameter indicative of conditions of the electrochemical system and the catalysis system;

a comparison unit operably connected to the data retrieval unit and configured to compare the at least one first value with respective at least one second value for respectively the at least one parameter for respective system, wherein the at least one second value is in a predefined memory location in the comparison unit; and a decision making unit operably connected to the comparison unit and configured to accept, reject, and/or adjust the at least one first value for respectively the at least one parameter for the respective system based on the comparison by the comparison unit, wherein the control unit is configured to decide the at least one second value for the at least one parameter indicative of the desired conditions of the catalysis system based on the calculated rate of oxidation of the metal ions in the anode electrolyte of the electrochemical system and/or deciding the at least one second value for the at least one parameter indicative of the desired conditions of the electrochemical system based on the calculated rate of reduction of the metal ions in the aqueous medium of the catalysis system.

In some embodiments, there is provided a unit for an on-line monitoring of a system, the unit comprising:

a control unit configured to calculate and control rate of oxidation of Cu ions at an anode in an anode electrolyte of an electrochemical system, wherein the electrochemical system comprises an anode chamber comprising an anode in contact with an anode electrolyte wherein the anode electrolyte comprises $CuCl$ and $CuCl_2$ in an aqueous medium and wherein the anode is configured to oxidize CuCl to $CuCl_2$; and the control unit configured to calculate and control rate of reduction of the Cu ions in a catalysis system, wherein the catalysis system comprises a reactor operably connected to the electrochemical system and configured to react $CuCl_2$ in the aqueous medium with an unsaturated or saturated hydrocarbon to form one or more organic compounds and CuCl;

a data retrieval unit operably connected to the control unit and configured to determine at least one first value for concentration of CuCl and/or $CuCl_2$ in the electrochemical system and the catalysis system;

a comparison unit operably connected to the data retrieval unit and configured to compare the at least one first value with respective at least one second value for the concentration of CuCl and/or $CuCl_2$ for respective system, wherein the at least one second value is in a predefined memory location in the comparison unit; and a decision making unit operably connected to the comparison unit and configured to accept, reject, and/or adjust the at least one first value for the concentration of CuCl and/or $CuCl_2$ for the respective system based on the comparison by the comparison unit, wherein the control unit is configured to decide the at least one second value for the concentration of CuCl and/or $CuCl_2$ indicative of the desired conditions of the catalysis system based on the calculated rate of oxidation of the Cu ions in the anode electrolyte of the electrochemical system and/or deciding the at least one second value for the concentration of CuCl and/or $CuCl_2$ indicative of the desired conditions of the electrochemical system based on the calculated rate of reduction of the Cu ions in the aqueous medium of the catalysis system.

Figure 2:
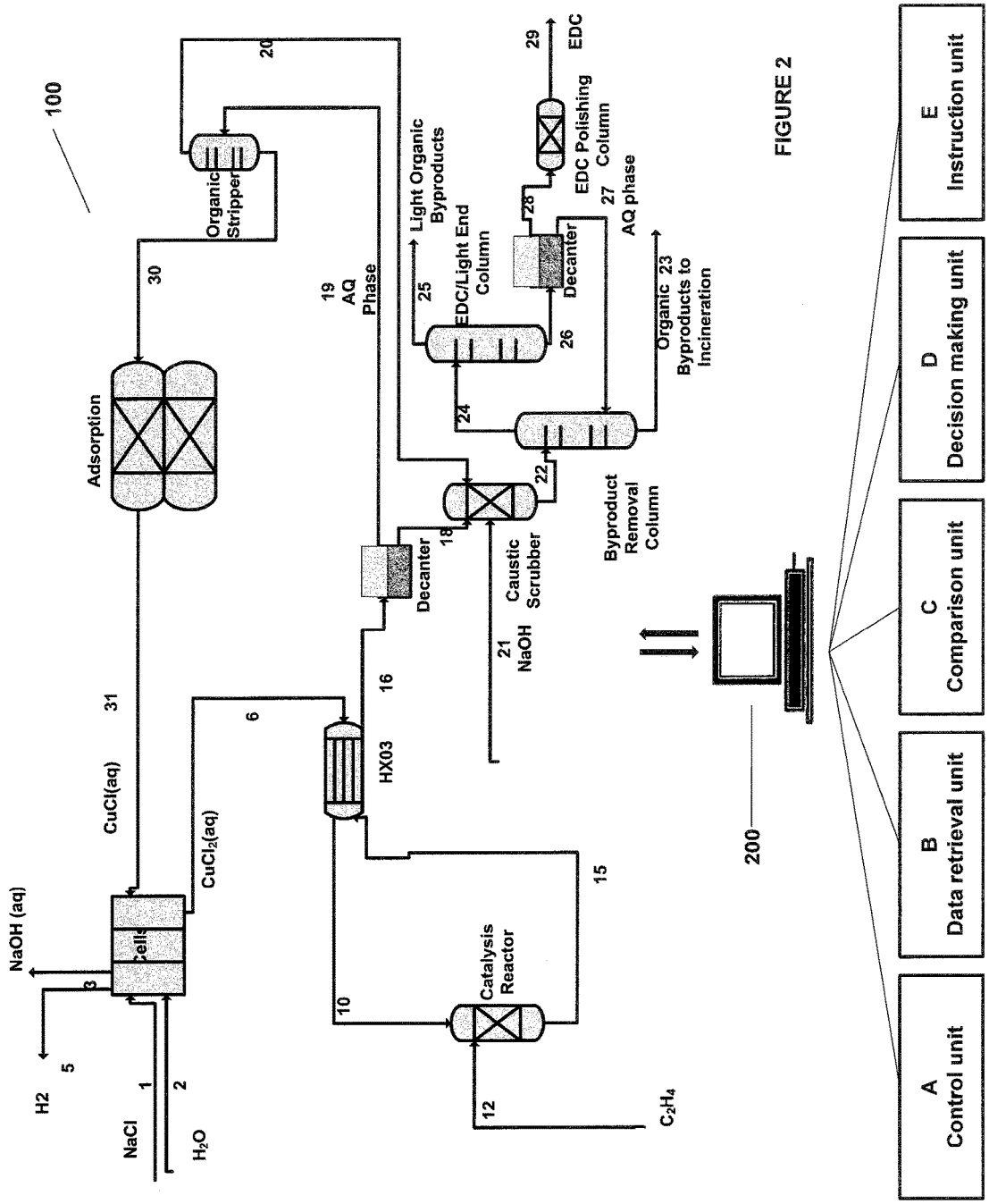
FIG. 2 is an illustration of some embodiments of the on-line monitoring methods and systems described herein.

FIG. 2 illustrates a unit/station 200 operably connected to the system 100. It is to be understood that the system 100 is an illustrative embodiment of the electrochemical system coupled with the catalysis system. Other variations of the system including variations in the location and/or number of the components, such as, but not limited to, reactors, columns, valves, pumps, conduits, heat exchange units, and connections, is well within the scope of the invention. One or more components shown in system 100 may not be present or other components not shown in the figures may be present in the system for its efficient operation. The system 200 of FIG. 2 that conducts an on-line monitoring of the process 100 of FIG. 1 is described in detail below.

In some embodiments, the unit may include a computer interface, (where on-line monitoring is computer-assisted or is entirely controlled by computer) configured to provide a user with input and output parameters or is automated to control the amount and conditions of the process, as described above.

In some embodiments of the aforementioned aspects and embodiments, the unit comprises a control unit (illustrated as A in FIG. 2) configured to calculate and control the rate of oxidation of metal ions at the anode in the anode electrolyte of the electrochemical system; and the control unit is configured to calculate and control the rate of reduction of the metal ions in the catalysis system. The electrochemical system and the control system have been described herein. In some embodiments, the control unit further comprises a computing unit wherein the computing unit fits the data received from the data retrieval unit into a formula in the predefined memory location to calculate the rate of the oxidation and/or the rate of the reduction of the metal ions. In some embodiments, the data received from the data retrieval unit that is used to calculate the rate of the oxidation and/or the rate of the reduction of the metal ions, is the at least one first value for respectively at least one parameter indicative of the conditions of the electrochemical system and the catalysis system.

In some embodiments, the control unit is configured to decide the at least one second value for the at least one parameter indicative of the desired conditions of the catalysis system based on the calculated rate of oxidation of the metal ions in the anode electrolyte of the electrochemical system and/or decide the at least one second value for the at least one parameter indicative of the desired conditions of the electrochemical system based on the calculated rate of reduction of the metal ions in the aqueous medium of the catalysis system.

In some embodiments, the control unit is configured to decide the at least one second value for the at least one parameter indicative of the desired conditions of the catalysis system in real time based on the calculated rate of oxidation of the metal ions in the anode electrolyte of the electrochemical system and/or deciding the at least one second value for the at least one parameter indicative of the desired conditions of the electrochemical system in real time based on the calculated rate of reduction of the metal ions in the aqueous medium of the catalysis system.

In some embodiments, the control unit is configured to balance the rate of oxidation in the electrochemical system and the rate of reduction in the catalysis system to achieve steady state.

In some embodiments of the aforementioned aspects and embodiments, the control unit is configured to send the at least one second value (after the decision) for the at least one parameter indicative of the desired conditions of the catalysis system and/or of the electrochemical system to the comparison unit.

In some embodiments of the aforementioned aspects and embodiments, the unit comprises a data retrieval unit (illustrated as B in FIG. 2) operably connected to the control unit and configured to determine at least one first value for respectively at least one parameter indicative of conditions of the system 100. The parameters have been described herein. For example, in some embodiments, the at least one parameter of the electrochemical system comprises without limitation, temperature, pressure, pH, density, ion concentration (including metal ions and salt ions), flow rate, voltage, current, or combinations thereof. For example, in some embodiments, the at least one parameter of the catalysis system comprises without limitation, temperature, pressure, density, ion concentration, flow rate, space time yield (STY), or combinations thereof.

In some embodiments of the aforementioned aspects and embodiments, the data retrieval unit is configured to determine the at least one first value for respectively the at least one parameter from one or more analytical components that may or may not be connected to the system selected from the group consisting of temperature probe, pressure probe, pH meter, oxidation-reduction potential (ORP) probe, quadruple mass spectrometer (QMS), ATR probe, ultramicroelectrode (UME) probe, gas chromatography (GC), titrator, inductively coupled plasma (ICP), total organic carbon (TOC) meter, electrochemical sensor, volatile organic compound (VOC) sensor, chlorine sensor, lower explosion limit (LEL) sensor, coriolis flow meter, and combinations thereof. It is to be understood that there can be other analytical components of the process from where the data can be retrieved and as such all such components are within the scope of this disclosure.

The one or more analytical components are configured for monitoring the flow of the unsaturated hydrocarbon or the saturated hydrocarbon e.g. the ethylene gas; or the concentration of the metal ions and/or salt ions in the aqueous medium of the catalysis system/saltwater of the analyte in the electrochemical cell; or the concentration of the organics in the aqueous medium/saltwater; or temperature; or pressure; or voltage and current; or STY, etc. The one or more analytical components may be any convenient device, for example, pressure probes (e.g., electromagnetic pressure sensors, potentiometric pressure sensors, etc.), temperature probes (resistance temperature detectors, thermocouples, gas thermometers, thermistors, pyrometers, infrared radiation sensors, etc.), volume probes (e.g., geophysical diffraction tomography, X-ray tomography, hydroacoustic surveyers, etc.), and devices for determining chemical makeup of the aqueous medium or the gas e.g., ultra micro electrode (UME), infrared (IR) spectrometer, nuclear magnetic resonance (NMR) spectrometer, ultraviolet (UV)-vis spectrophotometer, high performance liquid chromatographs, inductively coupled plasma (ICP) emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.

In some embodiments, the one or more analytical components may also include a computer interface which is configured to provide a user with the collected data about the temp, pressure, voltage, aqueous medium, metal ions and/or the organics, etc. For example, the analytical component may determine the concentration of the aqueous medium, metal ions and/or the organics and the computer interface may provide a summary of the changes in the composition within the aqueous medium, metal ions and/or the organics over time. In some embodiments, the summary may be sent to the control unit as data retrieved for the parameter or is stored as a computer readable data file or may be printed out as a user readable document.

Similarly, the collective data in the control unit obtained by the data retrieval unit may be stored as a computer readable data file or may be printed out as a user readable document.

In some embodiments, the data retrieval unit is configured to determine the at least one first value for respectively the at least one parameter indicative of conditions of a system from one or more analytical components which collect real-time data (e.g., internal pressure, temperature, flow rate, density, concentration of metal ions, etc.) about the aqueous medium, metal ions and/or the organics. In some embodiments, the one or more analytical components may be configured to determine the parameters of the process, such as, aqueous medium, metal ions and/or the organics at regular intervals, e.g., determining the composition every 1 minute, every 5 minutes, every 10 minutes, every 30 minutes, every 60 minutes, every 100 minutes, every 200 minutes, every 500 minutes, or some other interval. The data retrieved by the data retrieval unit is further processed in the control unit.

In some embodiments of the aforementioned aspects and embodiments, the data retrieval unit is configured to send the at least one first value and the control unit is configured to send the at least one second value for respectively the at least one parameter for respective system, to the comparison unit for comparison and storing in the predefined memory location.

In some embodiments of the aforementioned aspects and embodiments, the comparison unit (illustrated as C in FIG. 2) is operably connected to the data retrieval unit and is configured to compare the at least one first value determined by the data retrieval unit with respective at least one second value for respectively the at least one parameter for respective electrochemical or catalysis system, wherein the at least one second value is in a predefined memory location in the comparison unit. In some embodiments of the aforementioned aspects and embodiments, the comparison unit further comprises a computing unit wherein the computing unit is configured to fit the at least one first value into a formula in the predefined memory location to compute a third value and the comparing unit is configured to compare the third value with the respective at least one second value. As such, the user may store the formula in the predefined memory location in the comparison unit of the control unit.

In some embodiments of the aforementioned aspects and embodiments, the control unit comprises a decision making unit (illustrated as D in FIG. 2) operably connected to the comparison unit configured to accept, reject, and/or adjust the at least one first value for respectively the at least one parameter for the respective electrochemical or catalysis system based on the comparison by the comparison unit. In some embodiments, the decision making unit is configured to accept the at least one first value for respectively the at least one parameter when the at least one first value is substantially same as the at least one second value. In some embodiments, the decision making unit is configured to reject the at least one first value for respectively the at least one parameter when the at least one first value is different from the at least one second value.

In some embodiments of the aforementioned aspects and embodiments, the decision making unit is configured to send a signal to demonstrate the rejection. In some embodiments, the signal may be a beep, flash, ring, bell, or an alarm. In some embodiments, the signal may not be audible but is visual. After the signal is heard/seen from the unit, the user may manually adjust the parameters or the unit may send instructions to one or more components to adjust the parameters.

In some embodiments of the aforementioned aspects and embodiments, the control unit further comprises an instruction unit (illustrated as E in FIG. 2) operably connected to the decision making unit and configured to send instructions to the electrochemical system and/or the catalysis system based on the decision of the decision making unit. The instruction unit may operate manually, digitally, or automatically.

In some embodiments of the aforementioned aspects and embodiments, the instruction unit is configured to send instructions to the electrochemical system and/or the catalysis system to adjust the at least one first value for respectively the at least one parameter to match the at least one second value. In some embodiments of the aforementioned aspects and embodiments, the instruction unit is configured to send instructions to control one or more components of the electrochemical system and/or the catalysis system wherein the one or more components include, but not limited to, one or more valves, one or more pumps, one or more compressors, one or more heat exchange units, one or more heaters or coolers, power source, rectifier, one or more tanks, and combinations thereof to adjust the at least one first value for respectively the at least one parameter to match the respective at least one second value.

In some embodiments, the unit may be a computer interface which is configured to provide a user with the collected data about the process and systems 100. One or more of the control unit, data retrieval unit, comparison unit, decision making unit, and the instruction unit may be part of one or several units connected to each other. In some embodiments, all of the control unit, data retrieval unit, comparison unit, decision making unit, and the instruction unit are part of a single computer program encoded to carry out the on-line monitoring of the process.

In some embodiments, the unit may be a computer interface that provides a summary of the conditions of the process to the user over time. In some embodiments, the summary is stored as a computer readable data file or may be printed out as a user readable document. In some embodiments, the unit comprises a monitor screen to display the at least one first value for respectively the at least one parameter. In some embodiments, the unit comprises a monitor screen to display the at least one first value for respectively the at least one parameter with respect to the location of the parameter in the system. In some embodiments, the unit comprises a monitor screen that displays one or more components of the system selected from the group consisting of one or more valves, one or more pumps, one or more compressors, one or more heat exchange units, one or more heaters or coolers, power source, rectifier, one or more tanks, and combinations thereof. In some embodiments, the unit comprises a monitor screen that displays the aforementioned one or more components of the system with respect to their location in the system. In some embodiments, the unit comprises a monitor screen that displays the aforementioned one or more components of the system with respect to their location in the system as well as the one or more analytical components in the system. In some embodiments, the unit comprises a monitor screen that displays the aforementioned one or more components of the system with respect to their location in the system; the one or more analytical components in the system; and the values of the one or more parameters with respect to their location in the system. In some embodiments of the aforementioned aspects and embodiments, the unit has a monitor screen with a touch screen.

The unit may be connected to the one or more components as well as the one or more analytical components of the system through wires or wirelessly.

On-Line Monitoring of the UME System

In some embodiments of the aforementioned aspects and embodiments, the at least one parameter indicative of conditions of the process is metal ion concentration. In some embodiments, the metal ion concentration of the process can be analyzed by analytical instruments such as e.g. UME. Provided herein is an on-line monitoring process/system for the control and monitoring of the UME system.

The UME process and system is described in detail in U.S. patent application Ser. No. 14/937,751, filed Nov. 10, 2015, which is incorporated herein by reference in its entirety in the present disclosure.

Figure 3:
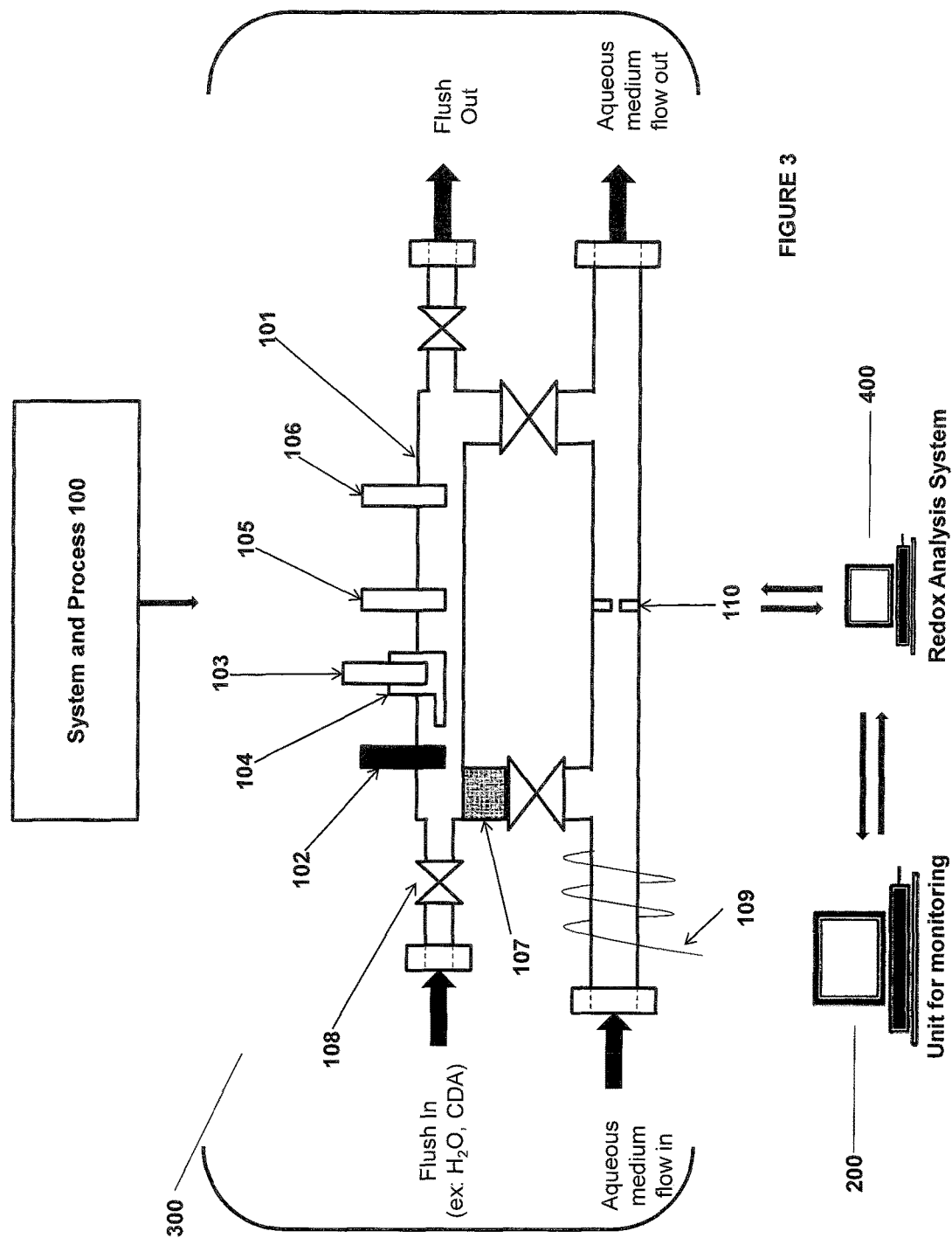
FIG. 3 is an illustration of some embodiments of the on-line monitoring of the UME described herein.

FIG. 3 illustrates an example of the UME system 300 connected in-line with the process 100. The process 100 has been described herein. The UME system 300 has been described in detail in U.S. patent application Ser. No. 14/937,751, filed Nov. 10, 2015, and a description of the UME system 300 has also been provided herein.

The UME system can be used to measure the concentration of the metal ions in the lower oxidation state by using electrodes that oxidize the metal ions from the lower oxidation state to the higher oxidation state. Certain voltage sweeps are applied to the electrodes in the UME system and the collected data is computed to calculate the concentration of the metal ions in the lower oxidation state. The concentration of the metal ion is measured in molar amounts. Provided herein is an automated on-line monitoring of the UME system using a redox analysis system (RAS) 400. The data retrieved by the redox analysis system 400 may be transmitted to the unit 200 for the overall on-line monitoring of the process 100.

The "UME" as used herein includes an electrode that has at least one dimension smaller than 30 um (microns). For example only, the UME may have at least one dimension between 0.1-30 um. The UME may be made of any conventional conductive electrode material including, but not limited to, gold, platinum, titanium, carbon, iridium, conductive polymer, and the like.

As illustrated in FIG. 3, the UME cell 101 contains a UME 102, a reference electrode 103, an optional salt bridge 104, an optional counter electrode 105, and an optional probe such as, but not limited to, temperature probe, pressure probe, pH probe, and/or TOC (Total Organic Carbon) meter 106. In some embodiments, all the components are fitted with compression fittings in the UME cell (not shown in the fig). The system further includes an optional adsorption unit 107 that may be operably connected to the UME cell 101. The flow of the process liquid streams in and out of the UME cell and/or through the adsorption unit may be controlled by a set of valves 108 which may be connected at various points through the system. The system may optionally be operably connected to a flush line to flush the cell with water or any other suitable solvent before and/or after the measurement of the metal ions. The system is also operably connected to the flow-in line of the process liquid stream comprising the metal ions and the one or more organic compounds. The system may optionally include a heating element 109 to keep the process liquid streams at a desired temperature. The system may optionally include a restricted orifice, pump, valve, or other device 110 to create pressure and force flow through UME assembly when valves are open. All the connections in the assembly could be flange, NPT, threaded, welded, and the like. In some embodiments, the UME system further comprise a power source operably connected to the UME cell and configured to provide voltage/current to the cell. It is to be understood that the components in the UME system illustrated in FIG. 3 may be arranged in a different order or arrangement depending on desired requirements. For example, more valves may be added or repositioned; the heating element may be repositioned, etc.

In one aspect, there is provided a method for an on-line monitoring of an ultramicroelectrode (UME) system connected in-line to a process, the method comprising:

(a) determining at least one X value for respectively at least one parameter of the UME system wherein the UME system is connected in-line to a process;

(b) comparing each of the at least one X value with respective at least one Y value, wherein the at least one Y value is in a predefined memory location;

(c) deciding, based on the comparing, to accept or adjust the at least one X value for respectively the at least one parameter of the UME system; and (d) sending instructions to the UME system to apply voltage sweeps to UME.

In some embodiments of the aforementioned aspect, the at least one parameter of the UME system is selected from the group consisting of temperature, voltage, pressure, flow rate of streams, current, power, and combinations thereof.

In some embodiments of the aforementioned aspect and embodiment, the method further comprises determining the at least one Y value for respectively the at least one parameter of the UME system indicative of desired value of the at least one parameter and storing the at least one Y value in the predefined memory location, wherein the determining the at least one Y value and the storing are performed before the step (a) of determining the at least one X value. In some embodiments of the aforementioned aspect and embodiment, the method further comprises after the deciding step (c), sending instructions to the one or more components of the UME system to continue or adjust the at least one X value for respectively the at least one parameter based on the decision wherein the one or more components of the UME system are selected from the group consisting of temperature controller to control temperature, pressure controller to control pressure, valve to control flow rate and/or pressure, potentiostat to control voltage, and combinations thereof.

For example, during an on-line monitoring of the UME system, the UME measurements may be made in a stop-flow condition. The first step in the measurement procedure may be to close the system's inlet and outlet valves. The valve controller in the redox analysis system may send instructions to the UME system to open or close the valves. The valves may allow the process liquid stream to enter the UME system for the measurement of the metal ion concentration. The measurement may be temperature dependent so all measurements may be made at the same temperature (e.g. 60-100° C.). The measurement may be maintained at the desired measurement temperature. Once the valves are closed, the process liquid stream may be allowed to sit until the temperature controller in the redox analysis system indicates that the process liquid stream is within the stipulated measurement range or a specific waiting period has elapsed. The redox analysis system will compare the measured temperature value (X) with the desired temperature value (Y) to determine if the desired temperature has reached in the UME system. At that point, the UME system may be run for the measurements. If the process liquid stream temperature has not reached or has gone beyond a temperature within the measurement range, the temperature controller in the redox analysis system may send instructions to heat up or shut off the heater and/or open/close the valves and increase/decrease the temperature of the process liquid stream, as desired.

Once the UME system reaches a desired temperature, the redox analysis system may send instructions to the UME system to apply voltage sweeps to the UME in the UME system for the measurement of the metal ion concentration. The protocol for the voltage sweeps and the measurement using the UME system has been described in detail in U.S. patent application Ser. No. 14/937,751, filed Nov. 10, 2015, which is incorporated herein by reference in its entirety. The protocol includes cleaning the surface of the UME from deposition of the one or more organic compounds by passing a gas on the surface of UME, by forming a gas on the surface of UME, by mechanically cleaning the surface of UME, or combinations thereof; and subjecting the UME to a set of one or more potential cycles causing oxidation of the metal ions in the lower oxidation state to a higher oxidation state or causing reduction of the metal ions in higher oxidation state to a lower oxidation state; and measuring a steady state current thereby measuring the concentration of the metal ions. The cleaning step may also involve subjecting the UME to a set of one or more potential cycles to form oxygen gas, chlorine gas, hydrogen gas, sulfur dioxide gas, or combinations thereof, on the surface of the UME. The potential cycles applied during the cleaning step and/or the measurement steps are collectively "voltage sweeps" herein.

For example, a cleaning step is performed prior to each series of measurements. Cleaning may be accomplished by applying a triangular voltage waveform comprising 5-10 cycles with certain amplitude at a certain slew rate. During the measurement step, steady state current data may be acquired over approximately six cycles of a square voltage wave with a certain amplitude, a certain rise time, and period. Data may be acquired at a sampling interval of 1 ms or less (≥1 kHz sampling). The steady state current data may be stored locally in the RAS system or may be sent to the control unit. Data analysis may be performed locally within the RAS system. The steady state current data may be fitted into a formula to deduce the diffusion coefficient and/or the metal ion concentration. A reduced data set including metal concentration, e.g. Cu(I) concentration, diffusion coefficient, and current may be sent back to the plant's control unit.

Accordingly, in some embodiments of the aforementioned aspect and embodiments, the method further comprises (e) determining at least one X value of current at electrode in the UME system to measure a metal ion concentration in the process; and (f) computing a Z value of diffusion coefficient and/or the metal ion concentration by fitting the at least one X value of the current into a formula wherein the formula is stored in a predefined memory location, thereby measuring the metal ion concentration in the process.

In some embodiments, the formula may be stored in a predefined memory location before the computation step.

In some embodiments of the aforementioned aspect and embodiments, the method further comprises sending the X, Y, and/or the Z values for respectively the at least one parameter of the UME system; the current of the electrode of the UME system; the diffusion coefficient; and/or the metal ion concentration to the control unit for the on-line monitoring of the process.

In one aspect, there is provided a redox analysis system for an on-line monitoring of an ultramicroelectrode (UME) system connected in-line to a process, the redox analysis system comprising:

a data retrieval unit configured to determine at least one X value for respectively at least one parameter of the UME system wherein the UME system is connected in-line to a process and is configured to measure metal ion concentration in the process;

a comparison unit operably connected to the data retrieval unit configured to compare each of the at least one X value with respective at least one Y value, wherein the at least one Y value is in a predefined memory location;

a decision making unit operably connected to the comparison unit configured to accept and/or adjust the at least one X value for respectively the at least one parameter based on the comparison by the comparison unit; and a controller operably connected to the decision making unit and configured to send instructions to the UME system to apply voltage sweeps to UME.

FIG. 4 illustrates a RAS unit/station 400 operably connected to the UME system 300.

In some embodiments, the RAS 400 may include a computer interface, (where on-line monitoring is computer-assisted or is entirely controlled by computer) configured to provide a user with input and output parameters or is automated to control the components and conditions of the UME system, as described above.

In some embodiments of the aforementioned aspects and embodiments, the RAS comprises a data retrieval unit (i)

configured to determine at least one X value for respectively at least one parameter of the UME system 300. The parameters of UME system have been described herein.

In some embodiments of the aforementioned aspects and embodiments, the data retrieval unit is configured to determine the at least one X value for respectively the at least one parameter from one or more components of the UME system selected from the group consisting of temperature probe (resistance temperature detectors, thermocouples, gas thermometers, thermistors, pyrometers, infrared radiation sensors, etc.), pressure probe (e.g., electromagnetic pressure sensors, potentiometric pressure sensors, etc.), pH meter, total organic carbon (TOC) meter, potentiostat, and combinations thereof. The data may be collected in real time. It is to be understood that there can be other analytical components of the process from where the data can be retrieved and as such all such components are within the scope of this disclosure.

For example, the computer interface of RAS may provide a summary of the changes in the temperature, pressure, flow rate, voltage, current, or combinations thereof over time. In some embodiments, the summary may be sent from RAS to the control unit as data retrieved for the parameter or is stored as a computer readable data file or may be printed out as a user readable document.

In some embodiments, the one or more probe components of the UME system may be configured to determine the parameters of the UME system, such as, temperature, pressure, flow rate, voltage, current etc. at regular intervals, e.g., every few seconds, every 1 minute, every 5 minutes, every 10 minutes, every 30 minutes, every 60 minutes, every 100 minutes, every 200 minutes, every 500 minutes, or some other interval. The data retrieved by the data retrieval unit is further processed in the RAS unit.

In some embodiments of the aforementioned aspects and embodiments, the data retrieval unit (1) is also configured to determine the at least one Y value for respectively the at least one parameter of the UME system before determining the at least one X value. In some embodiments, the data retrieval unit is configured to send the at least one Y value to the comparison unit (ii) for storing in the predefined memory location.

In some embodiments of the aforementioned aspects and embodiments, the comparison unit (ii) is operably connected to the data retrieval unit (1) and is configured to compare the at least one X value determined by the data retrieval unit with respective at least one Y value for respectively the at least one parameter, wherein the at least one Y value is in a predefined memory location in the comparison unit. In some embodiments of the aforementioned aspects and embodiments, the comparison unit further comprises a computing unit wherein the computing unit is configured to fit the at least one X value into a formula in the predefined memory location to compute a Z value and the comparing unit is configured to compare the Z value with the respective at least one Y value. As such, the user may store the formula in the predefined memory location in the comparison unit of the RAS unit.

In some embodiments of the aforementioned aspects and embodiments, the RAS unit comprises a decision making unit (iii) operably connected to the comparison unit (ii) configured to accept and/or adjust the at least one X value for respectively the at least one parameter based on the comparison by the comparison unit. In some embodiments, the decision making unit is configured to accept the at least one X value for respectively the at least one parameter when the at least one X value is substantially same as the at least one Y value.

In some embodiments of the aforementioned aspects and embodiments, the RAS unit further comprises a controller (iv) operably connected to the decision making unit and configured to send instructions to the UME system based on the decision of the decision making unit. The instruction unit may operate manually, digitally, or automatically.

In some embodiments of the aforementioned aspects and embodiments, the controller is configured to send instructions to the system to adjust the at least one X value for respectively the at least one parameter to match the at least one Y value. In some embodiments of the aforementioned aspects and embodiments, the controller is configured to send instructions to control one or more components of the UME system wherein the one or more components are selected from the group consisting of one or more valves, one or more heat exchange units, one or more heaters or coolers, power source, potentiostat, and combinations thereof to adjust the at least one X value to match the respective at least one Y value. The controller may comprise controls for monitoring and adjusting one or more parameters selected from temperature, pressure, flow rate, voltage, current, etc.

In some embodiments, the controller is configured to send instructions to the UME system to run the voltage sweeps at the electrode.

In some embodiments of the aforementioned aspect and embodiments, the RAS further comprises the data retrieval unit configured to retrieve at least one X value of current at electrode in the UME system to measure a metal ion concentration in the process; and (f) the comparison unit further comprises a computing unit configured to compute a Z value of diffusion coefficient and/or the metal ion concentration by fitting the at least one X value of the current into a formula wherein the formula is stored in a predefined memory location, thereby measuring the metal ion concentration in the process. In some embodiments, the formula may be stored in a predefined memory location before the computation.

One or more of the data retrieval unit, comparison unit, decision making unit, and the controller may all be part of one RAS unit. In some embodiments, all of the data retrieval unit, comparison unit, decision making unit, and the controller are part of a single computer program encoded in RAS to carry out the on-line monitoring of the UME system.

In some embodiments, the RAS unit may be a computer interface that provides a summary of the conditions of the UME system to the user over time. In some embodiments, the summary is stored as a computer readable data file or may be printed out as a user readable document. In some embodiments, the summary is transmitted to the control unit for the overall control of the process. In some embodiments, the RAS unit comprises a monitor screen to display the at least one X value for respectively the at least one parameter. In some embodiments, the RAS unit comprises a monitor screen to display the at least one X value for respectively the at least one parameter with respect to the location of the parameter in the UME system. In some embodiments, the RAS unit comprises a monitor screen that displays one or more components of the UME system selected from the group consisting of one or more valves, one or more heat exchange units, one or more heaters or coolers, power source, potentiostat, and combinations thereof. In some embodiments, the RAS unit comprises a monitor screen that displays the aforementioned one or more components of the UME system with respect to their location in the system. In some embodiments of the aforementioned aspects and embodiments, the RAS unit has a monitor screen with a touch screen.

The RAS unit may be connected to the UME system through wires or wirelessly.

Computer Program Product

In another aspect, there is provided a computer program product encoded on a non-transitory computer-readable medium, which when executed, causes a computer to perform an on-line monitoring of a system, the computer program product comprising:

instructions executable to calculate and control rate of oxidation of metal ions at an anode in an anode electrolyte of an electrochemical system; and to calculate and control rate of reduction of the metal ions in a catalysis system, wherein the electrochemical system comprises an anode chamber comprising an anode in contact with an anode electrolyte wherein the anode electrolyte comprises metal ions in an aqueous medium and wherein the anode is configured to oxidize the metal ions from a lower oxidation state to a higher oxidation state, and wherein the catalysis system comprises a reactor operably connected to the electrochemical system and configured to react the metal ions in the higher oxidation state in the aqueous medium with an unsaturated or saturated hydrocarbon to form one or more organic compounds;

instructions executable to retrieve at least one first value for respectively at least one parameter indicative of conditions of the electrochemical system and the catalysis system;

instructions executable to compare each of the at least one first value with respective at least one second value for respectively the at least one parameter for respective system, wherein the at least one second value is predefined;

instructions executable to make a decision to accept, reject, and/or adjust the at least one first value for respectively the at least one parameter based on the comparison; and instructions executable to decide the at least one second value for the at least one parameter indicative of the desired conditions of the catalysis system based on the calculated rate of oxidation of the metal ions in the anode electrolyte of the electrochemical system and/or instructions executable to decide the at least one second value for the at least one parameter indicative of the desired conditions of the electrochemical system based on the calculated rate of reduction of the metal ions in the aqueous medium of the catalysis system.

In one aspect, there is provided a computer program product encoded on a non-transitory computer-readable medium, which when executed, causes a computer to perform an on-line monitoring of a system, the computer program product comprising:

instructions executable to calculate and control rate of oxidation of Cu ions at an anode in an anode electrolyte of an electrochemical system; and to calculate and control rate of reduction of the Cu ions in a catalysis system, wherein the electrochemical system comprises an anode chamber comprising an anode in contact with an anode electrolyte wherein the anode electrolyte comprises CuCl and $CuCl_2$ in an aqueous medium and wherein the anode is configured to oxidize CuCl to $CuCl_2$, and wherein the catalysis system comprises a reactor operably connected to the electrochemical system and configured to react $CuCl_2$ in the aqueous medium with an unsaturated or saturated hydrocarbon to form one or more organic compounds and CuCl; instructions executable to retrieve at least one first value for concentration of CuCl and/or $CuCl_2$ in the electrochemical system and the catalysis system;

instructions executable to compare each of the at least one first value with respective at least one second value for the concentration of CuCl and/or $CuCl_2$ in the respective system, wherein the at least one second value is predefined;

instructions executable to make a decision to accept, reject, and/or adjust the at least one first value for the concentration of CuCl and/or $CuCl_2$ based on the comparison; and instructions executable to decide the at least one second value for the concentration of CuCl and/or $CuCl_2$ indicative of the desired conditions of the catalysis system based on the calculated rate of oxidation of the Cu ions in the anode electrolyte of the electrochemical system and/or instructions executable to decide the at least one second value for the concentration of CuCl and/or $CuCl_2$ indicative of the desired conditions of the electrochemical system based on the calculated rate of reduction of the Cu ions in the aqueous medium of the catalysis system.

In some embodiments of the aforementioned aspect, the product further comprises based on the decision, instructions executable to send instructions to the system to continue, stop, and/or adjust the at least one first value for the concentration of CuCl and/or $CuCl_2$.

In some embodiments of the aforementioned aspect, the computer program product further comprises instructions executable to fit the at least one first value for respectively at least one parameter into a formula in the predefined memory location to calculate the rate of the oxidation and/or the rate of the reduction of the metal ions.

In some embodiments of the aforementioned aspect and embodiments, the instructions executable to decide the at least one second value for the at least one parameter indicative of the desired conditions of the catalysis system based on the calculated rate of oxidation of the metal ions in the anode electrolyte of the electrochemical system, are in real time; and/or instructions executable to decide the at least one second value for the at least one parameter indicative of the desired conditions of the electrochemical system based on the calculated rate of reduction of the metal ions in the aqueous medium of the catalysis system, are in real time.

In some embodiments of the aforementioned aspect and embodiments, the computer program product further comprises instructions executable to balance the rate of oxidation in the electrochemical system and the rate of reduction in the catalysis system to achieve steady state.

In some embodiments of the aforementioned aspect, the instructions executable to retrieve at least one first value for respectively at least one parameter are the instructions executable to retrieve at least one first value from one or more analytical components selected from temperature probe, pressure probe, pH meter, oxidation-reduction potential (ORP) probe, quadruple mass spectrometer (QMS), ATR probe, ultramicroelectrode (UME) probe, gas chromatography (GC), titrator, inductively coupled plasma (ICP), total organic carbon (TOC) meter, electrochemical sensor, volatile organic compound (VOC) sensor, chlorine sensor, lower explosion limit (LEL) sensor, coriolis flow meter, and combinations thereof. The one or more analytical components have been described herein detail. The parameters have also been described herein.

In some embodiments of the aforementioned aspect, the instructions executable to retrieve also include instructions executable to store the at least one first value for respectively at least one parameter in a predefined memory location. In some embodiments of the aforementioned aspect and embodiments, the instructions executable to retrieve the at least one first value further include the instructions executable to fit the at least one first value into a formula in the predefined memory location to compute a third value. In some embodiments of the aforementioned aspect and embodiments, the computer program product further comprises instructions executable to store the formula in the predefined memory location.

In some embodiments of the aforementioned aspect and embodiments, the computer program product encoded on a non-transitory computer-readable medium comprises instructions executable to decide the at least one second value for respectively at least one parameter indicative of desired conditions of the system before determining the at least one first value or third value. In some embodiments, the instructions executable to decide the at least one second value also include instructions to store the at least one second value in predefined memory location.

In some embodiments of the aforementioned aspect and embodiments, the computer program product encoded on a non-transitory computer-readable medium comprises instructions executable to compare each of the at least one first value or each of the at least one third value with respective at least one second value, wherein the at least one second value is predefined.

In some embodiments of the aforementioned aspect and embodiments, the computer program product encoded on a non-transitory computer-readable medium comprises instructions executable to make a decision to accept, reject, and/or adjust the at least one first value for respectively the at least one parameter for respective electrochemical or catalysis system based on the comparison.

In some embodiments of the aforementioned aspect, the computer program product further comprises based on the decision, instructions executable to send instructions to the electrochemical and/or catalysis system to continue, stop, and/or adjust the at least one first value for respectively the at least one parameter.

In some embodiments of the aforementioned aspect and embodiments, the computer program product further comprises based on the decision, instructions executable to send instructions to the electrochemical and/or catalysis system to control one or more components of the system wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value.

In some embodiments of the aforementioned aspect and embodiments, the computer program product encoded on a non-transitory computer-readable medium, which when executed, causes a computer to perform an on-line monitoring of the process/system (the process and system described herein) to control at least one parameter for the process selected from the group consisting of temperature of e.g. between 70-200° C., pressure of e.g. between 100-300 psig, differential pressure, weight, level, density e.g. between 1-1.75, pH e.g. between 0-14, concentration of the metal halide in the higher oxidation state at more than 4M or between 4.5-8M, concentration of the metal halide in the lower oxidation state at more than 0.5M or between 0.5-2M, flow rate, residence time of e.g. between about 10 min-3 hour, voltage of e.g. between 1-3V, current of e.g. between 50 mA/cm$^2$-200 mA/cm$^2$, power, hazard gas concentration e.g. between 0-100,000 ppm (e.g. gases such as, EDC, $H_2$ gas), space time yield (STY) of the one or more organic compounds of e.g. between 0.5-2, and combinations thereof.

In one aspect, there is provided a computer program product encoded on a non-transitory computer-readable medium, which when executed, causes a computer to perform an on-line monitoring of a UME system connected in-line to a process, the computer program product comprising:

instructions executable to retrieve at least one X value for respectively at least one parameter of the UME system;

instructions executable to compare each of the at least one X value with respective at least one Y value, wherein the at least one Y value is predefined; and instructions executable to make a decision to accept and/or adjust the at least one X value for respectively the at least one parameter based on the comparison.

In some embodiments of the aforementioned aspect, the computer program product further comprises based on the decision, instructions executable to send instructions to the UME system to apply voltage sweeps. In some embodiments, the instructions are sent to the potentiostat to apply voltage sweeps to the UME based on the stored protocol.

In some embodiments of the aforementioned aspect and embodiments, the computer program product further comprises instructions executable to send instructions to the UME system to control one or more components of the UME system wherein the one or more components are selected from the group consisting of temperature controller to control temperature, valve to control flow rate and/or pressure, potentiostat to control voltage, and combinations thereof, to adjust the at least one X value to match the respective at least one Y value.

In some embodiments of the aforementioned aspect and embodiments, the computer program product further comprises instructions executable to retrieve at least one X value of current at electrode in the UME system to measure a metal ion concentration in the process.

In some embodiments of the aforementioned aspect and embodiments, the computer program product further comprises instructions executable to compute a Z value of diffusion coefficient and/or the metal ion concentration by fitting the at least one X value of the current into a formula wherein the formula is stored in a predefined memory location, thereby measuring the metal ion concentration in the process.

In some embodiments of the aforementioned aspect and embodiments, the computer program product further comprises instructions executable to send the data or the summary of the data to the control unit.

Process/System

The process or the system 100 illustrated in FIG. 1 is for illustration purposes only and variations of this process such as, different metal ions, different feed stocks, different products, and other variations are well within the scope of the process. Generally, in the process in the electrochemical system, oxidation of metal ions, such as, e.g. metal halides, from a lower oxidation state to a higher oxidation state occurs in the anode chamber of the electrochemical cell. The metal halide with the metal ions in the higher oxidation state may be then used in the catalysis systems by reaction with the unsaturated or saturated hydrocarbons such as, but not limited to, ethylene or ethane for the generation of the one or more organic compounds, e.g. only ethylene dichloride. The one or more organic compounds or enantiomers thereof include halohydrocarbons as well as any other side products formed in such reactions.

In FIG. 1, the electrochemical system is depicted as having an anode and a cathode separated by anion exchange membrane (AEM) and cation exchange membrane (CEM) creating a third middle chamber containing a third electrolyte, such as brine, e.g. NaCl solution. It is to be understood that only one ion exchange membrane (either AEM or CEM) may be present between the anode and the cathode chambers and such systems are well within the scope of the invention. The anode chamber includes the anode and an anode electrolyte in contact with the anode. In some embodiments, the anode electrolyte comprises saltwater and metal ions. The metal ions may be present in the form of metal halide or metal sulfate. In some embodiments, the cathode electrolyte comprises saltwater. The saltwater comprises alkali metal ions such as, for example only, alkali metal halide or alkaline earth metal ions such as, for example only, alkaline earth metal halide. The cathode chamber includes the cathode and a cathode electrolyte in contact with the cathode. The metal ion of the metal halide is oxidized in the anode chamber from the lower oxidation state to the higher oxidation state.

In such electrochemical cells, cathode reaction may be any reaction that does or does not form an alkali in the cathode chamber. Such cathode consumes electrons and carries out any reaction including, but not limited to, the reaction of water to form hydroxide ions and hydrogen gas or reaction of oxygen gas and water to form hydroxide ions or reduction of protons from an acid such as hydrochloric acid to form hydrogen gas or reaction of protons from hydrochloric acid and oxygen gas to form water.

The anode chamber of the electrochemical cell illustrated in FIG. 1 has anode that, on the application of voltage at the anode and the cathode, oxidizes metal ions illustrated as copper (I) chloride to copper (II) chloride. The middle chamber is illustrated to contain NaCl solution or brine. As can be appreciated by one ordinarily skilled in the art, the electrochemical system and method can be configured with an alternative, equivalent salt solution, e.g., an alkali metal ion or alkaline earth metal ion solution, e.g. potassium chloride solution or sodium chloride solution or lithium chloride solution or a magnesium chloride solution or calcium chloride solution or sodium sulfate solution or ammonium chloride solution, to produce an equivalent alkaline solution, e.g., potassium hydroxide or sodium hydroxide or magnesium hydroxide in the cathode electrolyte (or other reactions at the cathode described herein). This salt solution can be used as an anode electrolyte, cathode electrolyte, and/or brine in the middle compartment. Accordingly, to the extent that such equivalents are based on or suggested by the present system and method, these equivalents are within the scope of the application.

Further in FIG. 1, the catalysis reactor is illustrated as a system that uses metal halide with the metal ion in the higher oxidation state (illustrated as $CuCl_2$) and halogenates the unsaturated or the saturated hydrocarbon (illustrated as ethylene) to form one or more compounds or enantiomers thereof (illustrated as $C_2H_4Cl_2$ or ethylene dichloride), and the metal ion of the metal halide gets reduced from the higher oxidation state to the lower oxidation state (illustrated as $CuCl_2$ reducing to CuCl). It is to be understood that while the metal ion is oxidized from the lower to the higher oxidation state (electrochemical reaction) or reduced from the higher to the lower oxidation state (halogenation reaction) in the systems herein, there always is a mixture of the metal ions in the lower oxidation state and the higher oxidation state in each of the systems. It is also to be understood that the figures presented herein are for illustration purposes only and only illustrate few modes of the systems.

In some embodiments, all the systems comprise metal halide in saltwater. In some embodiments, metal halide is copper chloride in lower oxidation state as CuCl and higher oxidation state as $CuCl_2$. Examples of saltwater include water comprising alkali metal ions such as alkali metal halides or alkaline earth metal ions such as alkaline earth metal halides. Examples include, without limitation, sodium halide, potassium halide, lithium halide, calcium halide, magnesium halide etc. Halide includes any halogen from chloro, bromo, iodo, or fluoro.

The system 100 therefore, comprises an electrochemical cell comprising an anode in contact with an anode electrolyte wherein the anode electrolyte comprises metal ions in an aqueous medium (e.g. metal halide and saltwater); a cathode in contact with a cathode electrolyte; and a voltage source configured to apply a voltage to the anode and the cathode wherein the anode is configured to oxidize the metal ion from a lower oxidation state to a higher oxidation state; and a catalysis reactor operably connected to the electrochemical cell and configured to react the metal ions in the higher oxidation state in the aqueous medium with an unsaturated hydrocarbon or a saturated hydrocarbon to form one or more organic compounds and the metal ion in the lower oxidation state. In some embodiments, the system further comprises a separator (not shown in FIG. 1) operably connected to the reactor and the electrochemical cell and configured to separate the one or more organic compounds from the metal ion in the lower oxidation state in the saltwater after the reactor. In some embodiments, the separator is further configured to deliver the aqueous medium containing the metal ions in the lower oxidation state back to the electrochemical cell. In some embodiments, the system further comprises a conduit operably connected between the reactor and the electrochemical cell and configured to re-circulate back the saltwater after the reactor to the anode electrolyte of the electrochemical cell. The examples of conduits include, without limitation, pipes, tubes, tanks, and other means for transferring the liquid solutions. In some embodiments, the conduits also include means for transferring gases such as, but not limited to, pipes, tubes, tanks, and the like.

The "halogenation" or its grammatical equivalent, as used herein, includes a reaction of the unsaturated or the saturated hydrocarbon with the metal halide with the metal ion in the higher oxidation state to form one or more organic compounds.

The "unsaturated hydrocarbon" as used herein, includes a hydrocarbon with unsaturated carbon or hydrocarbon with at least one double and/or at least one triple bond between adjacent carbon atoms. The hydrocarbons with at least one double bond may be called olefins or alkenes and may have a general formula of an unsubstituted alkene as $C_nH_{2n}$ where n is 2-20 or 2-10 or 2-8, or 2-5 e.g. $C_{2-20}$ alkene or $C_{2-10}$ alkene or $C_{2-8}$ alkene etc. Examples of unsaturated hydrocarbon includes substituted or unsubstituted alkenes, including but not limited to, ethylene, chloro ethylene, bromo ethylene, iodo ethylene, propylene, chloro propylene, hydroxyl propylene, 1-butylene, 2-butylene (cis or trans), isobutylene, 1,3-butadiene, pentylene, hexene, cyclopropylene, cyclobutylene, cyclohexene, benzene, toluene, etc.

The "saturated hydrocarbon" as used herein, includes a hydrocarbon with no unsaturated carbon or hydrocarbon. The hydrocarbon may be linear, branched, or cyclic. For example, the hydrocarbon may be substituted or unsubstituted alkanes and/or substituted or unsubstituted cycloalkanes. The hydrocarbons may have a general formula of an unsubstituted alkane as $C_nH_{2n+2}$ where n is 2-20 or 2-10 or 2-8, or 2-5 e.g. $C_{2-20}$ alkane or $C_{2-10}$ alkane or $C_{2-8}$ alkane etc. Examples of saturated hydrocarbon includes substituted or unsubstituted alkanes, e.g. but not limited to, methane, ethane, chloroethane, bromoethane, iodoethane, propane, chloropropane, hydroxypropane, butane, chlorobutane, hydroxybutane, pentane, hexane, cyclohexane, cyclopentane, chlorocyclopentane, etc.

The "one or more organic compounds" used herein, include one or more of the organic compounds that may be formed by the reaction of the unsaturated or the saturated hydrocarbon with the metal halide with the metal ion in the higher oxidation state. The one or more organic compounds include halohydrocarbons and any side product formed from/with them. The "halohydrocarbon" or "halogenated hydrocarbon" as used herein, includes halo substituted hydrocarbons where halo may be any number of halogens that can be attached to the hydrocarbon based on permissible valency. The halogens include fluoro, chloro, bromo, and iodo. Examples of the halohydrocarbons include ethylene dichloride, chloroethanol, propyl dichloride, chloropropanol, butyl chloride, butyl dichloride, dichlorobutane, chlorobutanol, allyl chloride, chloroprene, etc. The side products of the one or more organic compounds include without limitation, propylene oxide, monochloroacetaldehyde, dichloroacetaldehyde, trichloroacetaldehyde, etc.

The "metal ion" or "metal" or "metal ion of the metal halide" as used herein, includes any metal ion capable of being converted from lower oxidation state to higher oxidation state. Examples of metal ions in the corresponding metal halide include, but not limited to, iron, chromium, copper, tin, silver, cobalt, uranium, lead, mercury, vanadium, bismuth, titanium, ruthenium, osmium, europium, zinc, cadmium, gold, nickel, palladium, platinum, rhodium, iridium, manganese, technetium, rhenium, molybdenum, tungsten, niobium, tantalum, zirconium, hafnium, and combination thereof. The "oxidation state" as used herein, includes degree of oxidation of an atom in a substance. For example, in some embodiments, the oxidation state is the net charge on the ion.

As used herein, the "voltage" includes a voltage or a bias applied to or drawn from an electrochemical cell that drives a desired reaction between the anode and the cathode in the electrochemical cell. In some embodiments, the desired reaction may be the electron transfer between the anode and the cathode such that an alkaline solution, water, or hydrogen gas is formed in the cathode electrolyte and the metal ion is oxidized at the anode. The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combination thereof.

In the system 100 provided herein, the solution in and out of the electrochemical cell, reactor, and/or separators may be in a batch flow or a flow through system.

In some embodiments of the method and system aspects and embodiments provided herein, the concentration of the metal ion (e.g. metal halide) in the lower oxidation state, concentration of the metal ion (e.g. metal halide) in the higher oxidation state, and the concentration of the salt in the water (e.g. alkali metal halide), and various other parameters described herein, each may affect the performance, yield, selectivity, STY, and voltage of each of the electrochemical cell/reaction and catalysis reactor/reaction. Due to the interchanging effect of the parameters on the efficiency of the process, the on-line monitoring of the process provided herein enables steady state of the electrochemical and the catalysis process by adjusting one or more of the parameters to desired values.

In some embodiments, the parameter such as, the desired temperature of the anode electrolyte in the electrochemical cell/reaction is between 70-90° C. and the temperature of the solution in the catalysis reactor/reaction is between 150-200° C. depending on the configuration of the electrochemical cell/reaction and the catalysis reactor/reaction. Therefore, by the on-line monitoring of the process, the temperature of the electrochemical cell/reaction and the catalysis reactor/reaction as well as the temperature of the other components of the process can be maintained at desired temperature.

In some embodiments of the foregoing embodiments, the one or more parameters in the catalysis reactor are selected from temperature of between about 120-250° C.; residence time of between about 10 min-3 hour; concentration of the metal halide in the higher oxidation state at more than 4M or between 4.5-8M, and combinations thereof.

In some embodiments of the foregoing aspects and embodiments, the parameter yield of one or more organic compounds is more than 30 wt % yield; or more than 40 wt % yield; or more than 50 wt % yield; or more than 60 wt % yield; or more than 70 wt % yield; or more than 80 wt % yield; or more than 90 wt % yield; or more than 95 wt % yield; or between 20-90 wt % yield; or between 40-90 wt % yield; or between 50-90 wt % yield, or between 50-99 wt % yield.

In some embodiments of the foregoing aspects and embodiments, the parameter STY (space time yield) of the one or more organic compounds from the unsaturated or the saturated hydrocarbon such as, e.g. ethylene or ethane, e.g. the STY of EDC from ethylene or ethane using the metal ions is more than 0.1, or more than 0.5, or is 1, or more than 1, or more than 2, or more than 3, or more than 4, or more than 5, or between 0.1-3, or between 0.5-3, or between 0.5-2, or between 0.5-1, or between 3-5, or between 3-6, or between 3-8. As used herein the STY is yield per time unit per reactor volume. For example, the yield of product may be expressed in mol, the time unit in hour and the volume in liter. The volume may be the nominal volume of the reactor, e.g. in a packed bed reactor, the volume of the vessel that holds the packed bed is the volume of the reactor. The STY may also be expressed as STY based on the consumption of the ethylene or ethane consumed to form the product. For example only, in some embodiments, the STY of the product may be deduced from the amount of ethylene consumed during the reaction. The selectivity may be the mol of product/mol of the ethylene or ethane consumed (e.g. only, mol EDC made/mol ethylene consumed). The yield may be the amount of the product isolated. The purity may be the amount of the product/total amount of all products (e.g. only, amount of EDC/all the organic products formed).

The parameters described herein may be selected in such a way that the one or more organic compounds are produced with high selectivity, high yield, and/or high STY. In some embodiments, the parameters described herein may be selected in such a way that the one or more organic compounds are produced with selectivity of more than 80 wt % or more than 90 wt %, yield of more than 80 wt % or more than 90 wt %, and/or STY of more than 0.5 or about 1-2. In some embodiments, the reaction between the metal chloride with the metal ion in higher oxidation state and the unsaturated or the saturated hydrocarbon, e.g. ethylene or ethane, is carried out in the catalysis reactor provided herein under pressure of between 100-500 psig or between 100-400 psig or between 100-300 psig or between 150-350 psig or between 200-300 psig, or combinations thereof, depending on the desired product.

In some embodiments of the aspects and the embodiments described herein, the at least one parameter for the electrochemical process and the catalysis process (as appropriate) is selected from the group consisting of temperature of e.g. between 70-200° C., pressure of e.g. between 100-300 psig, density e.g. between 1-1.75, pH e.g. between 0-14, concentration of the metal halide in the higher oxidation state at more than 4M or between 4.5-8M, concentration of the metal halide in the lower oxidation state at more than 0.5M or between 0.5-2M, flow rate, residence time of e.g. between about 10 min-3 hour, voltage of e.g. between 1-3V, current of e.g. between 50 mA/cm$^2$-200 mA/cm$^2$, power, hazard gas concentration e.g. between 0-100,000 ppm (e.g. gases such as, EDC, $H_2$ gas), space time yield (STY) of the one or more organic compounds of e.g. between 0.5-2, and combinations thereof.

The process and system illustrated in FIG. 1 also includes various components such as but not limited to, one or more valves, one or more pumps, one or more compressors, one or more heat exchange units, one or more heaters or coolers, power source, rectifier, one or more tanks, and combinations thereof. An illustration of such system is shown in FIG. 2. It is to be understood that FIG. 2 is for illustration purposes only and shows ethylene as an example of the unsaturated hydrocarbon. This process may be applied to any unsaturated or saturated hydrocarbon as described herein. Further, the components shown in the figure are also for illustrative purposes only. Many variations of such components including change in the order of some components are applicable to the process and all are well within the scope of the invention.

As shown in FIG. 2, sodium chloride 1 and water 2 along with a recycled stream of CuCl-rich aqueous solution 31 may be fed to an electrochemical process, producing aqueous sodium hydroxide 3 and hydrogen gas 5 at a cell temperature between 55-105° C., or between 65-100° C., or between 70-95° C., or between 80-95° C., or between 70-85° C., or 70° C., or 80° C., or 85° C., or 90° C. The hot sodium hydroxide solution possesses heat that may be utilized in a heat exchanger for heating other streams, such as, but not limited to, ethylene or the distillation columns.

The heat exchange system can be any unit configured to exchange heat between the streams. The heat exchange unit may be a double walled hollow tube, pipe or a tank to let the two streams pass each other counter-currently inside the tube separated by a wall so that the heat exchange may take place. In some embodiments, the tube may comprise one or more smaller tubes such that the streams flow counter currently through several hollow tubes inside one main tube. The material of the tube or the pipe may be corrosion resistant such as made from titanium. In some embodiments, the inner tube is made from titanium and not the outer tube or vice versa depending on the stream passing through the tube. For example only, the stream from the electrochemical system containing the metal ions may need a corrosion resistant material but the tube carrying hot water may not need to be corrosion resistant.

In the anode chamber of the electrochemical cell, CuCl in stream 31 is converted to $CuCl_2$. The $CuCl_2$ stream may be warmed in a heat exchanger HX03, exchanging heat with the reactor effluent 15. The $CuCl_2$ stream may be warmed by a series of heat exchanging units in order to achieve the optimum temperature for entering the reactor. This hot stream 10 may be optionally heated with steam (if more heating is required) and fed to the EDC production reactor (catalysis process/system). Ethylene is fed to the process as stream 12. This cold stream 12 requires heat to reach reactor temperature and in turn can be used to provide cooling elsewhere in the process. The heating of stream 12 can be achieved by using it to cool NaOH 3 or EDC product 29. In some embodiments, ethylene may additionally be heated using steam.

Following the heat exchange in HX03, the cooler reactor effluent 15 containing the one or more organic compounds and metal ions may be subjected to liquid-liquid separation process using a decanter, when an organic phase is removed as 18. The aqueous phase 19 may be subjected to a vapor-liquid separation process and may be passed through a distillation column, in which organics are stripped at an overhead stream, leaving the salt-containing aqueous stream 30 to pass to the adsorption column in which the organic content may be further reduced prior to return to the electrochemical cells as stream 31.

The organic phase from the decanter 18 and organic stripper overhead 20 may be fed to a scrubber, such as caustic scrubber 21 in which NaOH may react with byproducts, such as, but not limited to, chloroacetaldehydes, producing products such as, aqueous sodium formate and chloromethanes (e.g. methyl chloride, dichloromethane, chloroform). The product of the caustic scrubber may be fed to a byproduct removal column in which heavier impurities, such as but not limited to, chloroethanol and sodium formate may leave as a bottom product 23. The overhead 24 from this scrubbing system (scrubber and byproduct removal column) may then be sent to the purification sub process system containing distillation column, decanter and dehydration column.

The overhead 24 may be fractionated in a distillation column, resulting in an overhead 25 containing chloromethanes which may be incinerated or sold as a product. The bottom of the column, stream 26, may be fed to a decanter, which may remove an EDC-rich phase 28 containing less than 2 wt % of water. This EDC phase may be subjected to dehydration on a drying bed, to form substantially pure EDC 29. The drying bed may, for example, be molecular sieves. The water 27 may contain some EDC and may be fed back to the byproduct removal column, with the water eventually leaving with stream 23 for treatment, and the EDC being largely recovered in overhead 24. In some embodiments, the water 27 may be sent to membrane or activated carbon bed to remove water from the remaining byproducts which are further incinerated.

The system 100 in FIG. 2 shows the connection of the electrochemical cell and the catalysis reactor with the one or more components of the system such as one or more valves, one or more pumps, one or more compressors, one or more heat exchange units, one or more heaters or coolers, power source, rectifier, one or more tanks, and combinations thereof. The one or more analytical components are fitted on the system 100 to retrieve data about one or more parameters. The control unit 200 monitors the parameters of the system 100 through the analytical components described herein and then in turn controls the conditions of the system 100 by adjust the one or more components such as one or more valves, one or more pumps, one or more compressors, one or more heat exchange units, one or more heaters or coolers, power source, rectifier, one or more tanks, and combinations thereof.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Redox Analysis System

Redox analysis system is set up by creating and saving methods such as, setting up temperature window around desired measurement temperature, setting up maximum temperature equilibration time, setting up cleaning procedure, and setting up measurement procedure.

The system is set up by setting up the voltage ramp rates (up and down); the voltage dwell time; the voltage amplitude; the number of measurement cycles; and the time between consecutive measurement cycles (measurement rate).

The data analysis algorithm is modified and stored on the processor board.

The measurement method is initiated. The current measurement data acquisition rate is set up. The raw current data is viewed on a graph. The raw data files are stored locally. The system is calibrated and the calibration file is stored on the processor.

The temperature is read at various sampling rates. The temperature data is plotted vs. time. The temperature data is stored locally. The set point of temperature controller is modified accordingly. The high temperature limit is modified.

When commanded, the RAS performs the following actions to UME system: run voltage sweeps as per the settings; perform cleaning step; perform measurement step; acquire a data set of the current; compute the data set to calculate diffusion coefficient and metal ion concentration in molar amount; and optionally send the data set to the control unit.

What is claimed is:

1. A method for an on-line monitoring of a process, the method comprising:
   A. controlling using a computer rate of oxidation of metal ions at an anode in an anode electrolyte of an electrochemical process, wherein the electrochemical process comprises oxidizing the metal ions from a lower oxidation state to a higher oxidation state at the anode, the controlling step comprising:
      determining at least one first value for at least one parameter indicative of conditions of the electrochemical process during operation wherein the at least one parameter comprises temperature, pressure, pH, density, ion concentration, flow rate, voltage, current, or combinations thereof; comparing each of the at least one first value with respective at least one second value indicative of desired conditions of the electrochemical process, wherein the at least one second value is in a predefined memory location and is dynamic; deciding, based on the comparing, to accept, reject, and/or adjust the at least one first value for respectively the at least one parameter; and sending instructions to control one or more components of the process wherein the one or more components are selected from the group consisting of one or more valves, one or more pumps, one or more compressors, one or more heat exchange units, one or more heaters or coolers, power source, rectifier, one or more tanks, and combinations thereof to adjust the at least one first value to match the respective at least one second value to control the rate of oxidation of the metal ions in the anode electrolyte of the electrochemical process; and
   B. controlling using a computer rate of reduction of metal ions in a catalysis process, wherein the catalysis process comprises reacting the anode electrolyte comprising the metal ions in the higher oxidation state in the aqueous medium with an unsaturated or saturated hydrocarbon to form one or more organic compounds, the controlling step comprising:
      determining at least one third value for respectively at least one parameter, indicative of conditions of the catalysis process wherein the at least one parameter comprises temperature, pressure, density, ion concentration, flow rate, space time yield (STY), or combinations thereof; comparing each of the at least one third value with respective at least one fourth value indicative of desired conditions of the catalysis process, wherein the at least one fourth value is in a predefined memory location and is dynamic; deciding, based on the comparing, to accept, reject, and/or adjust the at least one third value for respectively the at least one parameter; and sending instructions to control one or more components of the process wherein the one or more components are selected from the group consisting of one or more valves, one or more pumps, one or more compressors, one or more heat exchange units, one or more heaters or coolers, power source, rectifier, one or more tanks, and combinations thereof to adjust the at least one third value to match the respective at least one fourth value to control the rate of reduction of the metal ions in the aqueous medium of the catalysis process;
   wherein the method comprises dynamically deciding the at least one fourth value indicative of the desired conditions of the catalysis process based on the rate of oxidation of the metal ions in the anode electrolyte of the electrochemical process and/or dynamically deciding the at least one second value indicative of the desired conditions of the electrochemical process based on the rate of reduction of the metal ions in the aqueous medium of the catalysis process and balancing the rate of oxidation in the electrochemical process and the rate of reduction in the catalysis process to achieve steady state.

2. The method of claim 1, wherein the deciding comprises adjusting the at least one first value for respectively the at least one parameter to match the at least one second value for respectively the same parameter.

3. The method of claim 1, wherein the at least one parameter of the electrochemical process is metal ion concentration in the analyte exiting anode chamber and the at least one parameter of the catalysis process is metal ion concentration in the aqueous medium exiting catalysis reactor.

\* \* \* \* \*